(12) United States Patent
Anthony

(10) Patent No.: US 10,076,723 B1
(45) Date of Patent: Sep. 18, 2018

(54) HUMIDIFICATION PROCESS AND APPARATUS FOR CHILLING BEVERAGES AND FOOD PRODUCTS AND PROCESS OF MANUFACTURING THE SAME

(71) Applicant: Michael Mark Anthony, Hohenwald, TN (US)

(72) Inventor: Michael Mark Anthony, Hohenwald, TN (US)

( * ) Notice: Subject to any disclaimer, the term of this patent is extended or adjusted under 35 U.S.C. 154(b) by 978 days.

(21) Appl. No.: 14/120,540

(22) Filed: May 30, 2014

(51) Int. Cl.
*B01D 53/26* (2006.01)

(52) U.S. Cl.
CPC .................................. *B01D 53/26* (2013.01)

(58) Field of Classification Search
CPC ... B01D 53/26; F25D 5/00; F25D 5/02; F25D 31/002; F25D 31/003; F25D 31/007
See application file for complete search history.

(56) References Cited

U.S. PATENT DOCUMENTS

| 2010/0251731 A1* | 10/2010 | Bergida | B65D 17/165 62/4 |
| 2012/0144845 A1* | 6/2012 | Leavitt | C05G 3/0005 62/4 |
| 2013/0174581 A1* | 7/2013 | Rasmussen | F25D 5/02 62/4 |

* cited by examiner

*Primary Examiner* — Elizabeth Martin
*Assistant Examiner* — Zachary R Anderegg
(74) *Attorney, Agent, or Firm* — Frank L. Kubler

(57) ABSTRACT

A novel self-cooling food and beverage container and a process for manufacturing the same is disclosed. A self-cooling beverage and food container using a substantive humidification cooling process within said food and beverage container for cooling food and beverage products is disclosed. Methods of assembling and operating the apparatus are disclosed.

9 Claims, 17 Drawing Sheets

HUMIDIFICATION PROCESS AND APPARATUS FOR CHILLING BEVERAGES AND FOOD PRODUCTS AND PROCESS OF MANUFACTURING THE SAME

BACKGROUND OF THE INVENTION

1. Field of the Invention

The present novel invention relates generally to the art of cooling food and beverage containers and to processes for manufacturing such containers. More specifically the present invention relates to food and beverage containers for cooling a beverage or food product; methods of cooling said food products; and methods of assembling and operating the apparatus. The terms "beverage," "food," "food products" and "container contents" are considered as equivalent for the purposes of this application and used interchangeably. The term "container" refers to any sealable and openable storage means for a beverage or food product meant for consumption.

2. Description of the Prior Art

There have previously been many self-cooling beverage devices for cooling the contents of a beverage or food product container. These apparatus sometimes use flexible and deformable receptacles or rigid receptacle walls to store a refrigerant for phase change cooling. Some prior art devices use desiccants to permit the absorption of water into a desiccant for cooling by evaporation. Other prior art device use refrigerants stored in pressure vessels in liquid phase to achieve the cooling by causing a phase change of refrigerants from a liquid to a gaseous state. The present inventor has invented a variety of such devices and methods of manufacturing these containers. All prior self-cooling beverage container technologies rely on the evaporation of a refrigerant from the liquid phase to the gaseous phase. Desiccant technologies rely the thermodynamic potential of a desiccant to absorb water from a gaseous phase into the desiccant to effectuate the evaporation of water. These earlier inventions do not satisfy all the needs of the beverage industry and they do not use pure gases and pure water as the sole ingredients that are used to cool a beverage and food product container. In fact they are so structurally different from the present invention, that one skilled in the art cannot possibly transcend from the prior art to the present invention, without an inventive process. In an effort to seek a cost effective and functioning apparatus for self-cooling a beverage container, the present inventor has done a variety of experiments to arrive at the present novel method. The following issues have kept the cost effective commercialization of all prior art prohibitively high.

Prior art that uses liquefied refrigerants fail to address the real issues of manufacturing and beverage plant operations that are crucial for the success of a self-cooling beverage container program. All such prior art designs require pressurized containers to store liquid refrigerants. The only liquid refrigerants that can be stored in commercially viable pressure canisters are HFC's CFC's, Hydrocarbons, Ethers, and other highly flammable low-pressure gases. These gases are not commercially viable and have led to difficulty in implementation of such technologies. Most commercial refrigerants are ozone depleting and global warming, and as such have been banned by the EPA in the USA and other governing bodies for direct release into the atmosphere as products of a self-cooling container. The EPA has mandated that no refrigerant be used in a self-cooling container except CO2 and if used the design must be safe. Refrigerant currently available cause both Global Warming and Ozone depletion. Generally they are common refrigerants such as 134A and 152A. In some cases, flammable gases such as butane and propane have been tried but the risk factors are high for several reasons. First the use of such technologies in a closed room can cause a variety of effects including asphyxiation, poisoning and so on. Second, the flammability of some refrigerants limits the number of containers that can be opened in a closed environment such as during parties or in a vehicle. The present inventor has experimented with these technologies and found them to be unsuitable for commercial viability. Also, the cost of refrigerants is very prohibitive and the cost of cooling cannot justify the use of refrigerant gases. Examples of patents that use this technology are U.S. Pat. Nos. 2,460,765, 3,494,143, 3,088,680, 4,319,464, 3,241,731, 8,033,132, 4,319,464, 3,852,975, 4,669,273, 3,494,141, 3,520,148, 3,636,726, 3,759,060, 3,597,937, 4,584,848, 3,417,573, 3,468,452, 654,174, 1,971,364, 5,655,384, 5,063,754, 3,919,856, 4,640,102, 3,881,321, 4,656,838, 3,862,548, 4,679,407, 4,688,395, 3,842,617, 3,803,867, 6,170,283, 5,704,222 and many others.

Prior art that uses cryogenic refrigerants such as CO2 fail to address the real issues of manufacturing and beverage plant operations that are crucial for the success of a self-cooling beverage container program. All such prior art designs require very highly pressurized containers to store the cryogenic refrigerants. Some technologies that promise to use CO2 have implemented carbon traps such as activated carbon to store the refrigerants in a carbon matrix. These added desiccants and activated carbon storage systems are too expensive to implement commercially and further, the carbon and other absorptive media that lowers the pressure can contaminate the beverage products. Cryogenic self-cooling containers that require the use of very pressure vessels and cryogenic gases such as CO2. These require expensive containers made from high pressure bearing materials such as aluminum, steel, or fiber-glass. They are essentially dangerous, since the pressure involved are generally of the order of 600 psi or more. Further, they are complicated since the pressures involved are much higher than a conventional beverage container can withstand; examples of prior art include U.S. Pat. No. 5,331,817, U.S. Pat. No. 5,394,703 to the present inventor, and U.S. Pat. Nos. 5,131,239, 5,201,183, and 4,993,236.

Desiccant-based self-cooling containers require the use of a desiccant medium to pull moisture and exert a vacuum and to withdraw a fluid such as water from a liquid phase to a vapor phase. These types of technologies require a desiccant medium stored in a vacuum chamber. When the vacuum is released, water is pulled into the desiccant and absorbed. The heat from the evaporated water is stored inside the desiccant and must not be allowed to interact with the beverage otherwise it heats up the beverage again. It is very difficult to maintain a vacuum in the desiccant and water reservoir. The desiccant takes up valuable space within the beverage container. The main driving force is a desiccant contained within the container that absorbs water vapor. These types of technologies are complicated because they need two separate chambers, one holds water and the other holds a desiccant under a vacuum state. Maintaining a vacuum in a pressurized beverage container is very difficult and migration of moisture into the desiccant can destroy the cooling capacity. Further, these technologies require a heat sink for removal of heat from the desiccant and so a complicated design is necessary to keep such heat away from the beverage or food product. The possibility of contamination of the beverage or the food product adjacent to the desiccant powder is a potential hazard and so the industry has essentially avoided the use of these technologies. Further, it is extremely difficult to handle desiccants crystals and powders in a mass-manufacturing environment where the desiccant has to be maintained moisture free and contaminant free. The beverage and food industry does not approve such manufacturing processes since the liability involved in contaminating their brands is too great a risk factor. Further, the absorption potential of desiccants reduces as the vacuum is released and evaporation starts, so that the process is inefficient and limited to the amount of desiccant used. In general these are not cost-effective technologies and they rely on extremely large canister designs in relation to the beverage containers that they are contained within. In fact the ratio of desiccant to water is about 3:1 and the ratio of the volumetric loss in such beverage containers is about 40%. The cost of the desiccant or sorbent, the cost of the container, and the cost of the process of manufacture is prohibitive and despite nearly 20 years of trials, companies like Tampra Inc. have not succeeded in generating a commercially viable technology. Example of patents that use this technology are U.S. Pat. Nos. 7,107,783, 6,389,839, 5,168,708, 6,141,970, 829,902,4, 462,224, 7,213,401, 4,928, 495, 4,250,720, 2,144,441, 4,126,016, 3,642,059, 3,379,025, 4,736,599, 4,759,191, 3,316,736, 3,950,960, 2,472,825, 3,252,270, 3,967,465, 1,841,691, 2,195,077 2,322,617, 5,168,708, 5,230,216, 4,911,740, 5,233,836, 4,752,310, 4,205,531, 4,048,810, 2,053,683, 3,270,512, 4,531,384, 5,359,861, 6,141,970, 6,341,491, 4,993,239, 4,901,535, 4,949,549, 5,048,301, 5,079,932, 4,513,053, 4,974,419, 5,018,368, 5,035,230, 6,889,507, 5,197,302, 5,313,799, 6,151,911, 6,151,911, 5,692,381, 4,924,676, 5,038,581, 4,479,364, 4,368,624, 4,660,629, 4,574,874, 4,402,915, 5,233,836, 5,230,216. U.S. Pat. No. 5,983,662 uses a sponge in place of a desiccant to cool a beverage. The true nature of a desiccant-cooled system is that the vacuum in the desiccant assists in evaporating the liquid to a gaseous phase and by so doing, heat is removed from the liquid and the water-vapor is then absorbed by the desiccant. The water vapor deposits its heat inside the desiccant as it is absorbed, thus existing desiccant technologies require the desiccant to cause evaporation of the liquid by a continuous vacuum state imposed inside the headspace of the cooling liquid water storage space.

Prior art also reveals chemically endothermic self-cooling containers. These rely on the use of a chemical reaction to absorb heat from the container contents. U.S. Pat. Nos. 3,970,068, 3,970,068, 2,300,793, 2,620,788, 4,773,389, 3,561,424, 3,950,158, 3,887,346, 3,874,504, 3,804,077, 4,753,085, 4,528,218, 5,626,022, 6,103,280, and numerous others use endothermic reactions to cool the beverage container.

The present invention differs from all the mentioned prior art and provides a novel cost effective and thermodynamically simple and viable method of removing heat and cooling a beverage in a beverage container. Many trials and designs have been made to obtain the present configuration of the disclosed invention.

Generally related U.S. patents include US Patent numbers: U.S. Pat. No. 4,319,464, issued on March 1982 to Dodd; U.S. Pat. No. 4,350,267, issued on September 1982 to Nelson et al.; U.S. Pat. No. 4,669,273, issued on June 1987 to Fischer et al; U.S. Pat. No. 4,802,343 issued on February 1989 to Rudick et al; U.S. Pat. No. 5,447,039 issued on September 1995 to Allison; U.S. Pat. No. 5,845,501 issued on December 1998 to Stonehouse et al; U.S. Pat. No. 6,065,300, issued on May 2000 to Anthony; U.S. Pat. No. 6,102,108 issued on August 2000 to Sillince; U.S. Pat. No. 6,105,384 issued on August 2000 to Joseph; U.S. Pat. No. 6,341,491, issued on January 2002 to Paine et al; U.S. Pat. No. 6,817,202, issued on November 2004; and Anthony, U.S. Pat. No. 7,107,783.

It is thus an object of the present invention to provide a method of activating a pressure receptacle using carbonation pressure.

It is another object of the present invention to provide such a method of assembling the self-cooling container using only dry gas as a cooling thermodynamic fluid instead of the phase change of a an expanding refrigerant fluid.

It is still another object of this invention to provide a self-cooling container apparatus for products such as foods and beverages which cools a product within the container using a thermodynamic heat exchange created by the humidification of a dry gas with a liquid.

It is a yet another object of the present invention to provide such an apparatus which does not require a continuous vacuum such as that needed to drive a desiccant cooling process.

It is a further object of the present invention to provide such an apparatus in which the only active ingredient is an extremely dry gas.

It is a still further object of the present invention to provide such an apparatus which eliminates the need for a heat exchanger through taking heat directly from the product itself.

It is an additional object of the present invention to provide such an apparatus which removes the need for a thermal sink by eliminating the need for a heat creating desiccant or chemical reaction.

It is finally an object of the present invention to provide such an apparatus which is thermodynamically simple, viable and cost effective of removing heat from and thereby cooling a product.

SUMMARY OF THE INVENTION

The present invention accomplishes the above-stated objectives, as well as others, as may be determined by a fair reading and interpretation of the entire specification.

The present invention eliminates the need for cryogenic liquids, refrigerants, and desiccants by using the thermodynamic potential of extremely dry gases such as air to remove heat from a beverage. Instead of using a liquefied refrigerant in conjunction with a beverage, the liquid of the beverage itself is used to humidify a very dry gas and achieve the desired cooling. The present invention does not require a special chemical other than a dry gas stored under pressure and the water already contained within a beverage. The present invention bypasses all steps used by desiccant technologies and other processes and goes directly into the properties of dry gases to absorb liquid from a beverage and effectuate the evaporation of the liquid directly into the dry air stream to raise its dew point and cool the food or beverage product. The purpose of a desiccant is to remove moisture from humid air. Desiccant structures implement the step of removing this moisture by absorbing the moisture within the headspace of a cooling chamber to remove the heat. A continuous vacuum is needed to drive this process. The present invention bypasses this step by removing the water in a gas stream ahead of storage. Thus, no desiccant is needed, and no refrigerant is needed other than the water contained within the beverage itself. Advantageously, both water and the dry gas are safe and generally used for living and consumption.

The present invention differs from all the cited prior art and discloses a novel technology for bottles and cans (metal and plastic beverage containers) also with the additional aspect of using a dry gas such as air as the only active ingredients used for cooling a beverage. The cost of manufacture is now only limited by the containment design, which in itself is an advantage over all prior art. Advantageously the invention teaches a method of cooling a beverage by means of humidification of dry gas instead of using a desiccant to dehumidify a moist gas.

To this end, a method is provided of cooling a product including the steps of: providing a product container having a product release port with release port opening means and containing a product and a humidification liquid; providing a dry gas source opening into the product container and gas release means for releasing dry gas from the dry gas source; operating the release port opening means to open the product release port; and operating the gas release means to release dry gas from the dry gas source into the product container upon opening of the product release port; so that dry gas from the dry gas source gathers moisture from the humidification liquid and absorbs heat from the product as a result of humidification of the dry gas. Where the product is a liquid, a quantity of the product itself preferably functions as the humidification liquid. Where the product is semi-solid or solid, a separate liquid which preferably is simply water is provided in the product container with the product to function as the humidification liquid.

The gas release means preferably includes a gas release port, including the additional steps of: charging the dry gas canister member with pressurized dry gas; providing a tight fitting temporary pin valve member for fitting into the gas release port in the dry gas canister member to act as a valve; and fitting the temporary pin valve member snugly and sealingly into the gas release port to temporarily close the gas release port. The method preferably includes the additional step of: displacing the temporary pin valve member by inserting an actuation pin valve member into the gas release port. The dry gas preferably is one of: air, nitrogen and carbon dioxide.

A cooling container apparatus is provided, including a product container having a product release port; a dry gas vessel within the product container defining a product space and a head space between the dry gas vessel and the product container, the product space containing a quantity of product and moisture and a pressurizing gas in the head space at a head space pressure above ambient, the dry gas vessel containing dry gas under pressure and having a gas release port and a gas valve in the gas release port; and valve operating means for opening the valve to release the dry gas from the dry gas vessel and through the head space; so that the dry gas passes through the container and is humidified by the moisture and exits the container through the product release port. The gas valve preferably includes an actuation pin valve. The actuation pin valve member preferably includes a tubular spray stem having a diametric cross hole through which dry gas passes during release.

The product container preferably is one of a metal can and a plastic bottle. The dry gas preferably includes one of air, nitrogen and carbon dioxide. The dry gas preferably has a dew point below 150 degrees Fahrenheit.

A cooling container apparatus is further provided, including a product container containing a product, and having and a container top wall and a container bottom wall and a head space between the container top wall and container opening means; a dry gas canister within the product container, the dry gas canister containing a dry gas and having a canister closed end and a canister valve member retention hole; a tubular actuating sleeve member having a sleeve member closed end with an end wall and a sleeve member open end and having a sleeve member narrower segment adjacent to the sleeve member closed end and a sleeve member wider segment extending to the sleeve member open end and fitted around the dry gas canister, the sleeve member narrower segment being sized to fit snugly around the dry gas canister, the sleeve member closed end including an actuation pin member protruding sealingly into the actuation pin valve member retention hole and defining an actuation chamber between the canister valve end and the sleeve member closed end; so that the actuating sleeve member functions as a spray nozzle and an actuator for starting the cooling process.

The sleeve member preferably has an inward surface including axially extending ribs for transferring heat from the product to the dry gas canister, the ribs being separated by channels functioning as passageways for carrying released dry gas to the head space. The actuation pin valve member preferably includes a tubular spray stem having a diametric cross hole through which dry gas passes when released. The product container preferably is one of a metal can and a plastic bottle. The sleeve member closed end portion rests against and is fastened to the product container bottom wall. The product container bottom wall preferably is inwardly domed and wherein the sleeve member closed end portion is similarly inwardly domed to fit substantially flush against the container bottom wall.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
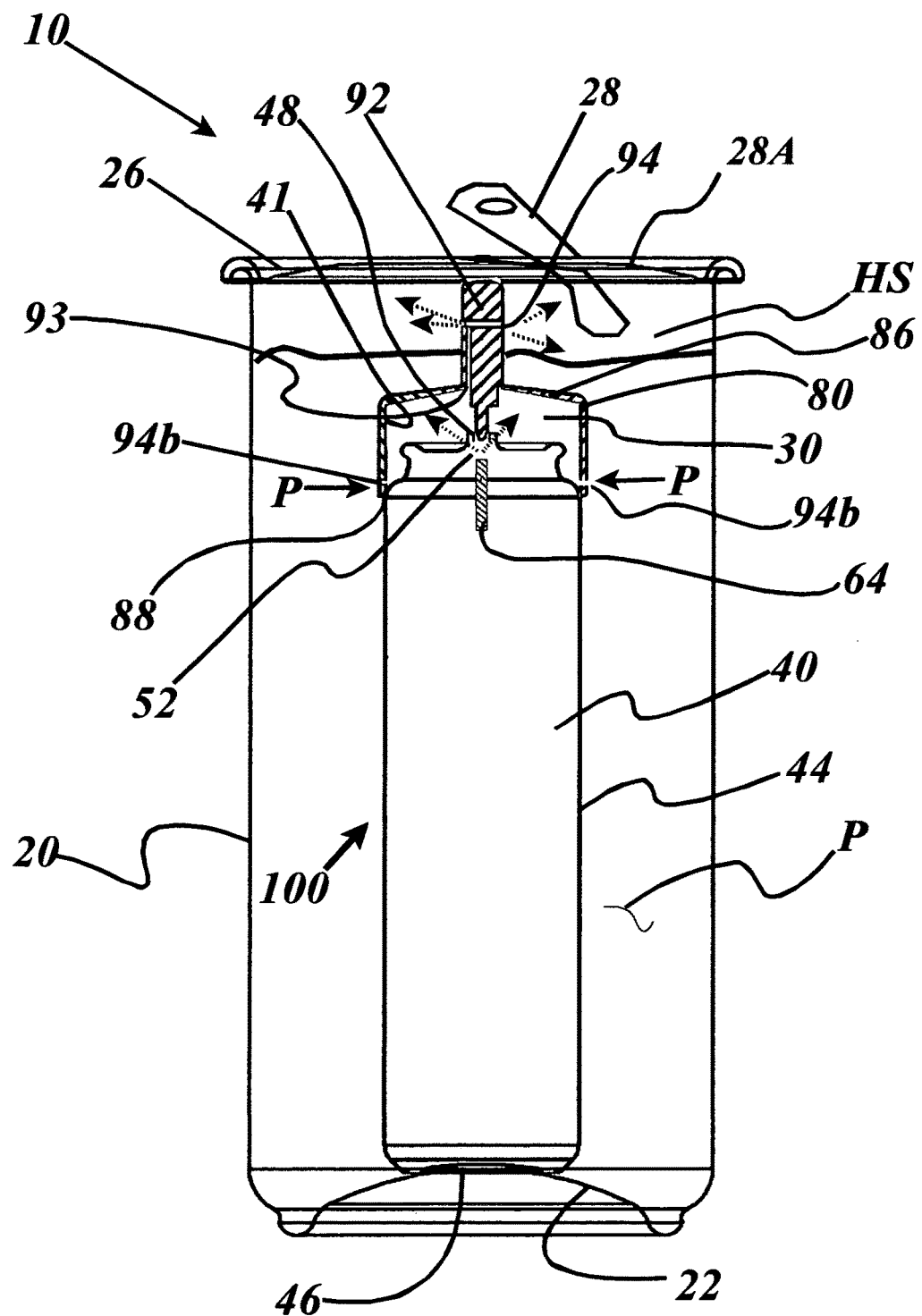
FIG. 1 is a cross section of an embodiment of the invention showing an opened beverage container with dry gas exiting the dry gas canister for cooling.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

The Invention Generally

Referring to FIGS. 1-17, a self-cooling food and beverage container apparatus 10 is disclosed. For the preferred of several possible embodiments, the apparatus 10 includes a conventional beverage or food product container 20 such as a metal can or plastic bottle for containing a food or beverage product P to be consumed. All such food and beverage containers 20 shall be collectively referred to as beverage container 20.

In the first embodiment, a dry gas canister member 40 is made as a pressure vessel from suitable moisture impervious materials such as Polycarbonate, PET or Aluminum. A cooling canister assembly 100 including an actuation pin valve 60 or fill valve comprising an O-ring 62 within the dry gas canister member 40 and a temporary sealing pin valve member 64 is incorporated into the dry gas canister member 40 so that the dry gas canister member 40 can be filled with extremely dry pressurized gas GS such as air or $CO_2$ that has been dehumidified to below freezing (−10° F. to −150° F.). Dry gas GS is stored within the dry gas canister member 40 under pressure and held in by the temporary sealing pin valve member 64. An actuation sleeve member 80 in the form of an open-ended thin sleeve cylindrical sleeve is placed coaxially centered and encapsulating the dry gas canister member 40 to hold it in place. A small actuation pin valve member 66 is attached to a sleeve member closed end 82 of the actuating sleeve member 80 to replace the temporary sealing pin valve member 64 of the dry gas canister member 40 and to seal off the canister member supply port 52 of the dry gas canister member 40 in its stead when in the appropriate position. A portion of the length of the sleeve member cylindrical wall portion 84 at the sleeve member closed end 82 of the actuating sleeve member 80 forms a tight sealing fit around the canister member outer wall 44 of the dry gas canister member 40 to form a closed actuation chamber 30 between the dry gas canister member 40 and the actuating sleeve member 80. The remaining portion of the actuating sleeve member 80 diameter is slightly larger than the dry gas canister member 40 diameter to form a thin cylindrical humidification gap GP between the outer wall of the dry gas canister member 40 and the cylindrical wall 84 of the actuating sleeve member 80. The actuating sleeve member 80 can be affixed to a wall portion of the beverage container 20, preferably, the container bottom domed-wall 22 of a metal container 20, and in the case of a plastic beverage bottle 53, it can be suitably attached to the neck wall 24 of a plastic beverage container 20. The cooling canister assembly 100 can also be left to float within the beverage container 20.

In the case of a carbonated beverage P, the carbonated beverage P is filled as usual into the beverage container 20 and the beverage container 20 is sealed for future consumption and use. During this period, gases GSB from the beverage are allowed to permeate into the actuation chamber 30 and equilibrate with the beverage P pressure. When the beverage container 20 is opened for consumption, a pressure change in carbonation occurs suddenly. The pressure within the actuation chamber 30 momentarily increases and allows a slight axial displacement of the dry gas canister member 40 relative to the actuating sleeve member 80. This causes the actuation pin valve member 66 of the actuating sleeve member 80 to be displaced and removed from the dry gas canister member 40 to release dry gas GS into the humidification gap GP. In the case when the beverage P is not carbonated, a small charge of nitrogen GS can be used to exert pressure within the beverage P and allow the actuation of the actuation pin valve member 66 to occur as mentioned earlier.

The dew points of various gases vary with the temperature of the gas GS and thus the thermodynamic properties of gases and water undergo a complex and beautiful symphony in nature. As an example, dry gas GS already has a deficient thermodynamic heat potential and so has a very energetic thermodynamic potential to remove heat by evaporation to bring it back to its dew point at room temperature. The lower the dew point of the dry gas GS, the more thermodynamic heat it can remove from the water in a beverage product P.

Method

In practicing the invention, the following method may be used. Advantageously the invention teaches a method of cooling a beverage P by means of humidification of dry gas GS in the stead of dehumidification of moist gas with an absorption desiccant. In the context of using various gases, most of the gases GS that can be used fall within the definition of gases naturally contained in air. As such air is to be used interchangeably with the suitable gases GS that can be used in this invention without limiting the scope of the invention.

Given a beverage mass of $M_b$, the heat capacity $C_p$, the heat to be removed to bring about a temperature change of $\Delta T$, is given by $$Q_c = M_b C_p \Delta T,$$

The amount of water (kg/sec) evaporated from an area of exposure A, to dry gas GS at temperature equal to the water and with starting humidity ratio, $x_s=0.005$, (Kg of $H_2O$ per Kg of dry gas), to generate water with a relative humidity ratio $x=0.02$, is given by the empirical formula (The 2003 ASHRAE Handbook-HVAC Applications), (ASHRAE 2003), (Shah 1990, 1992, 2002):

$$g = \theta A_{x_s - x}$$

Where, $\theta = (25 + 19v)$, and v is the velocity of the gas flow.

As an example using air GS, substantial calculations show that for a flow rate of 10 m/sec of air for 10 seconds of flow at a starting relative humidity of 0.005 and an exposure area of about 4.9 cm$^2$ (diameter of 2.5 cm and 25 cm long cylinder), the approximate rate of removal of water is equal to 1.58×10-3 kg/sec. This translates to about 35,900 Joules of energy removed. A beverage P of mass of about 300 grams (approximately 12 oz.) undergoing a temperature change of $\Delta T = 20°$ C., will require about 26,000 Joules of energy to be removed. It is evident there is a lot of thermodynamic potential stored in the dry gas for heat removal. Dry air, $CO_2$, and Nitrogen have very similar thermodynamic behavior for humidification processes. As such dry air is not the only gas GS that can be used for this purpose. Any suitable extremely dry gas GS such as $CO_2$ will suffice as long as its due point can be adequately lowered to be thermodynamically acceptable. Studies published by W. W. Mansfield in Nature 205, 278 (16 Jan. 1965); doi:10.1038/205278a0 entitled the "Effect of Carbon Dioxide on Evaporation of Water", and studies published by Frank Sechrist in Nature 199, 899-900 (31 Aug. 1963), entitled "Influence of Gases on the Rate of Evaporation of Water" show that water containing dissolved carbon dioxide, or surrounded by an atmosphere of this gas, evaporated 15-50 percent more rapidly than water in the presence of just air. Thus, advantageously, the use of a dry gas GS such as $CO_2$, which is already found in carbonated beverages, can definitely increase the cooling capacity of dry gases GS on water.

The present invention removes the need for a heat exchanger since the heat is taken directly from the beverage P itself. Further, it removes the need for a thermal sink since no heat is generated by a desiccant or a chemical reaction. The advantageous removal of the thermal-load from the gas GS by pre-drying the gas GS to a very low dew point even below −150° F. makes it possible for the invention to bypass the need for heat sinks, desiccants, and thermal heat transfer surfaces. The dry gas GS can be in direct contact with the beverage or food product P and no harm results to the product. In the case when the product P is sensitive to oxygen levels, nitrogen or $CO_2$ can be used instead of air. Further the costs have been considerably lowered by this invention and this makes a self-cooling container 20 viable for mass manufacturing. The invention is characterized by just three or less manufactured parts: the dry gas canister member 40, the actuating sleeve member 80 to contain the dry gas GS, and the actuation pin valve member 66 to release the stored dry gas GS. In certain cases, it is possible to forgo the use of the actuating sleeve member 80 and simply expose the dry gas GS to the beverage P to absorb and cool the beverage P by humidification. In such a case, the actuating sleeve member 80 may just be replaced by the actuation pin valve member 66.

First Preferred Embodiment

As shown in FIG. 1, in a first embodiment of the invention, a conventional beverage container 20 is used with the invention consisting of either a metal can 20, or a plastic bottle 20 of a conventional design. The first embodiment of the apparatus 10 incorporates a conventional metal beverage container 20. To assemble and use the invention, a conventional beverage container 20 is prepared as a receptor of a cooling canister assembly 100. The tooling canister assembly 100 consists of a dry gas canister member 40 and an actuation sleeve member 80.

The dry gas canister member 40 comprises of a substantially thin-walled cylindrical container, similar to an aerosol container of suitable diameter and length to hold the required volume of stored dry gas GS. The dry gas canister member 40 is made from either a suitable plastic material by injection-blow molding, or from suitable spun metals such as aluminum alloys. Both these processes are well established in industry and are very cost effective means of manufacturing. The plastic 20 that may be used to make the dry gas canister member 40 must be water and moisture resistant and should have good moisture barrier potentials. Multi-layered plastic blow molding technics can be used to form a good moisture and oxygen migration barrier in making the dry gas canister member 40. The dry gas canister member 40 must be of suitable dimensions for insertion into the beverage container 20 before the beverage container 20 is sealed. The dry gas canister member 40 may be injection blow-molded to form a thin-walled cylindrical container with a canister member closed end portion 46 and a canister member narrow neck valve portion 48.

In the case where the dry gas canister member 40 is made from metal, it can be made by spinning metal alloys to form a pressure vessel with a narrow neck valve portion 48 that terminates in a canister member supply port also referred to as pin valve member retention hole 52. The diameter of the pin valve member retention hole 52 should be sized to control the flow rate of pressurized dry gas GS stored the dry gas canister member 40. A size of about 0.05 mm to 0.5 mm in diameter can accommodate all suitable gas GS expulsion rates that may be required for the various pressures and gas types used. The size of pin valve member retention hole 52 should be made to allow the dry gas GS from dry gas canister member 40 to exit and permeate and comingle properly with the particular beverage P being cooled to allow proper heat exchange occur. In some cases, carbonation of the beverage P may cause foaming and frothing and the size of pin valve member retention hole 52 should be made to avoid uncontrollable carbonation or frothing especially in beers and sodas. Thus effectively, dry gas canister member 40 is a pressure vessel such as an aerosol container of suitable size that can store pressurized dry gases GS. It is preferable that the closed end portion 46 of the dry gas canister member 40 be spherical to allow an even pressure profile, however, the closed end portion 46 of dry gas canister member 40 can also be designed to act as a mating surface for gluing and holding the canister assembly 40 at the container bottom domed wall 22 of a beverage container 20 such as a metal can 20.

A tight fitting pin valve member 64 is provided to act as a valve that fits snugly and sealingly into pin valve member retention hole 52. Pin valve member 64 is be used to temporarily block-off the pin valve member retention hole 52 of the dry gas canister member 40 after charging the dry gas canister member 40 with pressurized dry gas GS. The pin valve member retention hole 52 is preferably small in diameter and cylindrical in shape, however it may be made to have a cross-section of any shape that is suitable for its purposes. An O-ring 62 or a rubber seal may be incorporated to form a tight seal and block off gases from escaping between the outer diameter of the pin valve member 64 and the inner diameter of the pin valve member retention hole 52. Other temporary valve configurations may be used to effectuate the sealing of the gases GS in dry gas canister member 40 before final assembly.

An actuating sleeve member 80 is made in the form of a thin-walled cylinder with a closed end portion 82 and an open neck portion 84. The actuating sleeve member 80 serves as a spray nozzle and an actuator for starting the cooling process. The closed end portion 82 of the actuating sleeve member 80 connects to a cylindrical wall portion 84 of the actuating sleeve member 80 and has an inner wall diameter that forms a tight snug fit over the outer diameter of the dry gas canister member 40. The inner wall of the closed end portion 82 of the actuating sleeve member 80 has a central axially protruding cylindrical actuation pin valve member 65 that is used to displace the temporary pin valve member 64 and to seal-off the pin valve member retention hole 52 of the dry gas canister member 40 during storage. The outer wall of the closed end portion 86 of the actuating sleeve member 80 has a smaller diameter central axially protruding cylindrical spray stem 92. An axially oriented spray feed-hole 93 through cylindrical spray stem 92 connects the interior of the closed end portion 86 of the actuating sleeve member 80 to a spray cross-hole 94 on the spray stem 92. A second spray feed hole 93A may be incorporated to allow minimal motion of the actuating sleeve member 80 during actuation. Thus spray cross-hole 94 becomes exposed to the actuation chamber 30 when spray cross hole 94A is still inside the canister member 40 so that dry gas can pass freely between them to the outside of canister member 40. If the canister member is attached to the domed end of the beverage container at the closed end portion 82 of the actuating sleeve member 80, then the actuating sleeve member open neck portion 88 should be above the beverage product P level. If the canister member is attached to the domed end 20 of the beverage container at the closed end portion 82 of the actuating sleeve member 80, then actuating sleeve member open neck portion 88 should be above the beverage product P level. It is important that the spray cross-hole 94 in the spray stem 92 be above the liquid level of the beverage product P in the container 20 so that the dry gas and the beverage can form a mist above the headspace HS of the beverage product P. Thus, the height of the canister assembly 100 must be designed accordingly.

To assemble the first embodiment, the dry gas canister member 40 is first vacuumed so that all gases are removed from therein. This ensures that no moisture is present within the dry gas canister member 40. A suitable dry gas GS such as $CO_2$ or air is dehumidified as much as possible to remove all moisture contained in it. Standard humidification equipment can be used to dehumidify the gas GS and store it in storage tanks for future use. Dehumidification equipment such as Aircell made by CompressedAir, USA, Enervac, made by Enervac Inc, USA, and from other manufacturers can be used to dehumidify the gas to up to −100° F. Compressed gas dryers are commonly found in a wide range of industrial and commercial facilities. Such dehumidification equipment use technologies that rely on Desiccant dryers with dew points up to −100° F., Refrigerated dryers with dew points up to −50° F., Deliquescent dryers, Membrane Dryers with dew points up to −150° F.

Dry gas GS that has been prepared is supplied into the dry gas canister member 40 until the maximum allowable pressure is attained for storage. Temporary sealing pin valve member 64 is then inserted into the pin valve member retention hole 52 of the dry gas canister member 40 to seal off and temporarily store the dry gas GS therein. The narrow neck valve portion 48 of the dry gas canister member 40 is then passed axially centered through the open end portion of the actuating sleeve member 80 and made to snugly engage the inner surface of the cylindrical wall portion 84 of the actuating sleeve member 80 to form a sealed actuation chamber 30 with the closed end portion 82 of the actuating sleeve member 80. At the same time, the pin valve member 64 that maintains the pressure within the dry gas canister member 40 is displaced and replaced by the actuation pin valve member 66 of the actuating sleeve member 80 to act as the final seal of the dry gas canister member 40. A small beverage-feed-cross-hole 94b made through the cylindrical wall portion of the actuation sleeve member 80 is sealed off by the outer wall 44 of the dry gas canister 40 and the actuation chamber sleeve member inner wall 41.

In this embodiment, if a metal beverage container 20 is used, the contour of the outer wall of the closed end 46 of the dry gas canister member 40 is preferably shaped to match the container bottom domed wall 22 of the can 20. This way, the dry gas canister member 40 can be affixed to the domed bottom domed-end of the can 20 using a suitable food grade epoxy, or by using ultrasonic welding. Thus, the canister assembly 100 is affixed centrally within the beverage container 20 so that the spray stem 92 of the actuating sleeve member 80 is above the headspace of the beverage P within the beverage container 20.

The canister assembly 100 comprising the beverage container 20 and the canister assembly 100 is now ready to be filled with beverage P contents. Advantageously, the beverage P is filled and the beverage container closure 26 is placed and sealed over the beverage container 20 to keep the contents under carbonation or nitrogen pressure. As the beverage P pressure rises, carbonation (or nitrogen) gases and liquids used with the beverage P permeate the actuation chamber 30 and equilibrate in pressure with the surrounding beverage P pressure. The assembled container apparatus 10 is then ready for consumption.

To use the invention, the beverage container opening means 28 is opened to allow the carbonation pressure to drop and equilibrate with atmospheric pressure. Stored carbonation pressure within the actuation chamber 30 will increase relative to atmosphere and cause the actuation sleeve member 80 to slide relative to the dry gas canister member 40. This causes the actuation chamber 30 to expand until the beverage-feed-cross-hole 94b of the cylindrical wall portion 84 of the actuating sleeve member 80 is exposed to the actuation chamber 30. Actuating sleeve member 80 pulls out the actuation pin valve member 66 to open up the dry gas canister member 40 and allow the dry gas GS to escape from therein and enter into the actuation chamber 30. Actuation chamber 30 expands and causes the beverage-feed-cross-hole 94b to be exposed inside the actuation chamber. Dry air GS is then passed from the actuation chamber through an axially oriented spray feed-hole 93 and through the spray cross-hole 94 on the spray stem 92. It is important that the spray cross-hole 94 in the spray stem 92 be above the liquid level of the beverage container 20. Since the beverage-feed-cross-hole 94b is exposed to the actuation chamber 30 by this action, the beverage P is pulled into the actuation chamber 30 and to fill it. Dry gas GS propels the liquid beverage P through the spray feed-hole 93 and through the spray cross-hole 94 on the spray stem 92, to form a continuous spray of dry gas GS and liquid beverage P above the beverage head space HS. It is important that the spray cross-hole 94 in the spray stem 92 be above the liquid P level of the beverage container 20. The dry air humidifies by causing liquid from the beverage P to evaporate. An adequate amount of energy is absorbed from the beverage P by the water that evaporates, thereby cooling the beverage P contents.

Second Preferred Embodiment

In a second embodiment of the invention, a conventional beverage container 20 is used with the invention consisting of either a metal can, or a plastic bottle of a conventional design.

In this embodiment, the dry gas canister member 40 could be assembled with the actuation chamber 30 attached to the bottom dome 22 of a beverage container 20, and alternatively, the dry gas canister member 40 could be assembled with the closed 46 of the canister member 40 attached to the bottom dome 22 of a beverage container 20. The second embodiment of the invention is also used with a conventional beverage container 20. To assemble and use the invention, a conventional beverage container 20 is prepared as a receptor of a canister assembly 100. The canister assembly 100 consists of a dry gas canister member 40 and an actuation sleeve member 80.

The dry gas canister member 40 comprises of a substantially thin-walled cylindrical container, similar to an aerosol container of suitable diameter and length to hold the required volume of stored dry gas GS. The dry gas canister member 40 is made from either a suitable plastic material by injection-blow molding, or from suitable spun metals such as aluminum alloys. Both these processes are well established in industry and are very cost effective means of manufacturing. The plastic that may be used to make the dry gas canister member 40 must be water and moisture resistant and should have good moisture barrier potentials. Multi-layered plastic blow molding technics can be used to form a good moisture and oxygen migration barrier in making the dry gas canister member 40. The dry gas canister member 40 must be of suitable dimensions for insertion into the beverage container 20 before the beverage container 20 is sealed. The dry gas canister member 40 may be injection blow-molded to form a thin-walled cylindrical container with a closed end portion 46 and a narrow neck valve portion 48. In the case when it made from metal, it can be made by spinning metal alloys to form a pressure vessel with a narrow neck valve portion 48 that terminates in a pin valve member retention hole 52. The diameter of the pin valve member retention hole 52 should be sized to control the flow rate of pressurized dry gas GS stored the dry gas canister member 40. A size of about 0.05 mm to 0.5 mm in diameter can accommodate all suitable gas expulsion rates that may be required for the various pressures and gas types used. The size of pin valve member retention hole 52 should be made to allow the dry gas GS from dry gas canister member 40 to exit and permeate and comingle properly with the particular beverage being cooled to allow proper heat exchange occur. In some cases, carbonation of the beverage P may cause foaming and frothing and the size of pin valve member retention hole 52 should be made to avoid uncontrollable carbonation or frothing especially in beers and sodas. Thus effectively, dry gas canister member 40 is a pressure vessel such as an aerosol container of suitable size that can store pressurized dry gases GS. In one embodiment, the closed end portion 46 of the dry gas canister member 40 be made with a spherical dome profile to allow an even pressure profile, however when installed in a conventional beverage metal container, it is preferable that the closed end portion 46 of dry gas canister member 40 can also be designed as a reverse concave dome to act as a mating surface for gluing and holding the canister assembly 100 at the container bottom domed wall 22 of a beverage container 20 such as a metal can.

As shown in FIGS. 2 to 15, a temporary tight fitting pin valve member 64 is provided to temporarily act as a sealing valve that fits snugly and sealingly into pin valve member retention hole 52 when the dry gas canister member canister member 40 is first charged with dry gas GS. Pin valve member 64 is be used to temporarily block-off the pin valve member retention hole 52 of the dry gas canister member 40 after charging the dry gas canister member 40 with pressurized dry gas GS. The pin valve member retention hole 52 is preferably small in diameter and cylindrical in shape, however it may be made to have a cross-section of any shape that is suitable for its purposes. An O-ring 62 or a rubber seal may be incorporated to form a tight seal and block off gases GS from escaping between the outer diameter of the temporary pin valve member 64 and the inner diameter of the pin valve member retention hole 52. Other temporary valve configurations may be used to effectuate the sealing of the gases GS in dry gas canister member 40 before final assembly.

Figure 2:
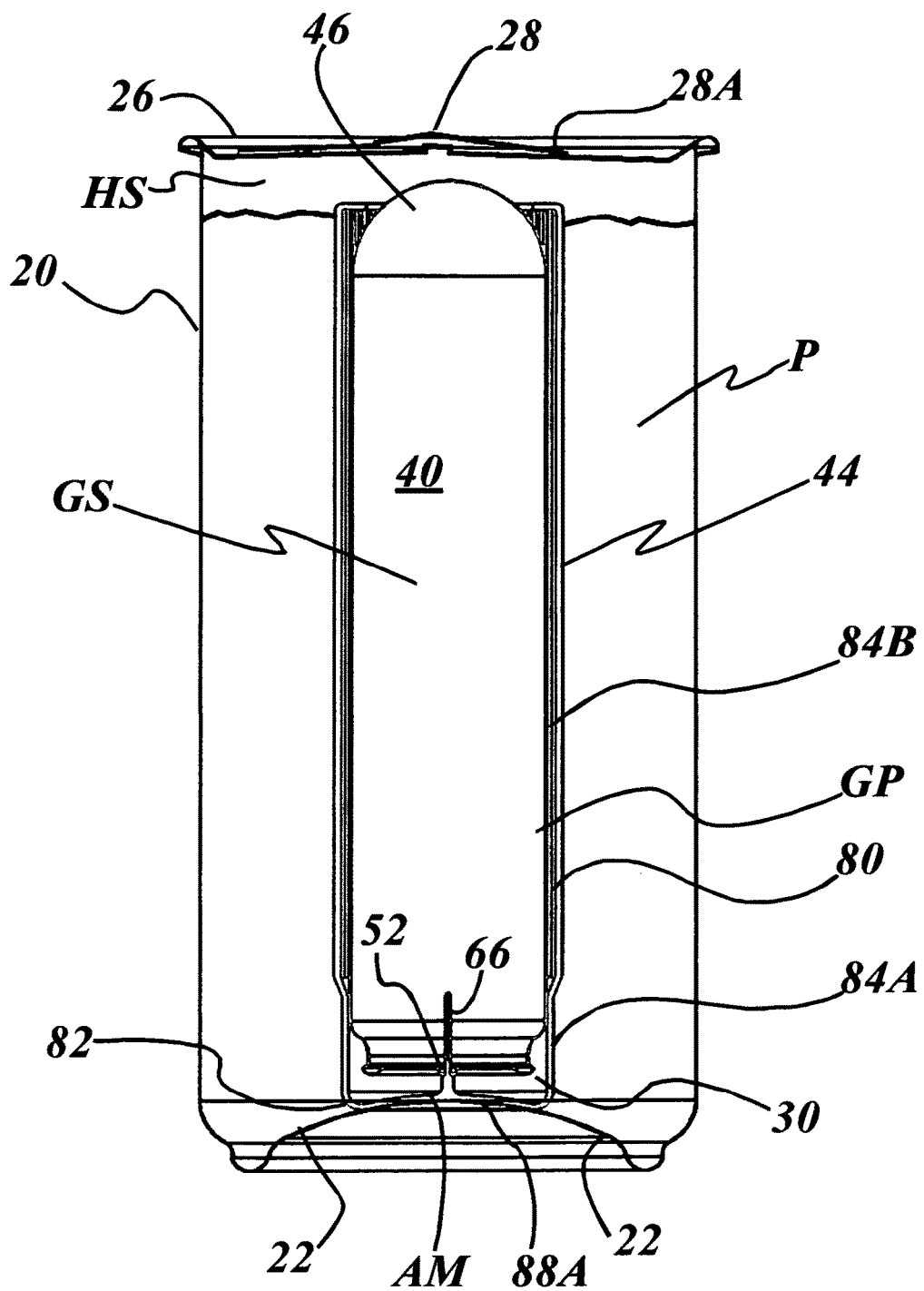
FIG. 2 is a cross-sectional side view of a first embodiment of the invention in which the product container is a metal can. The can is shown unopened so that the pin valve is closed and the dry gas remains contained in the dry gas canister under pressure.
Figure 3:
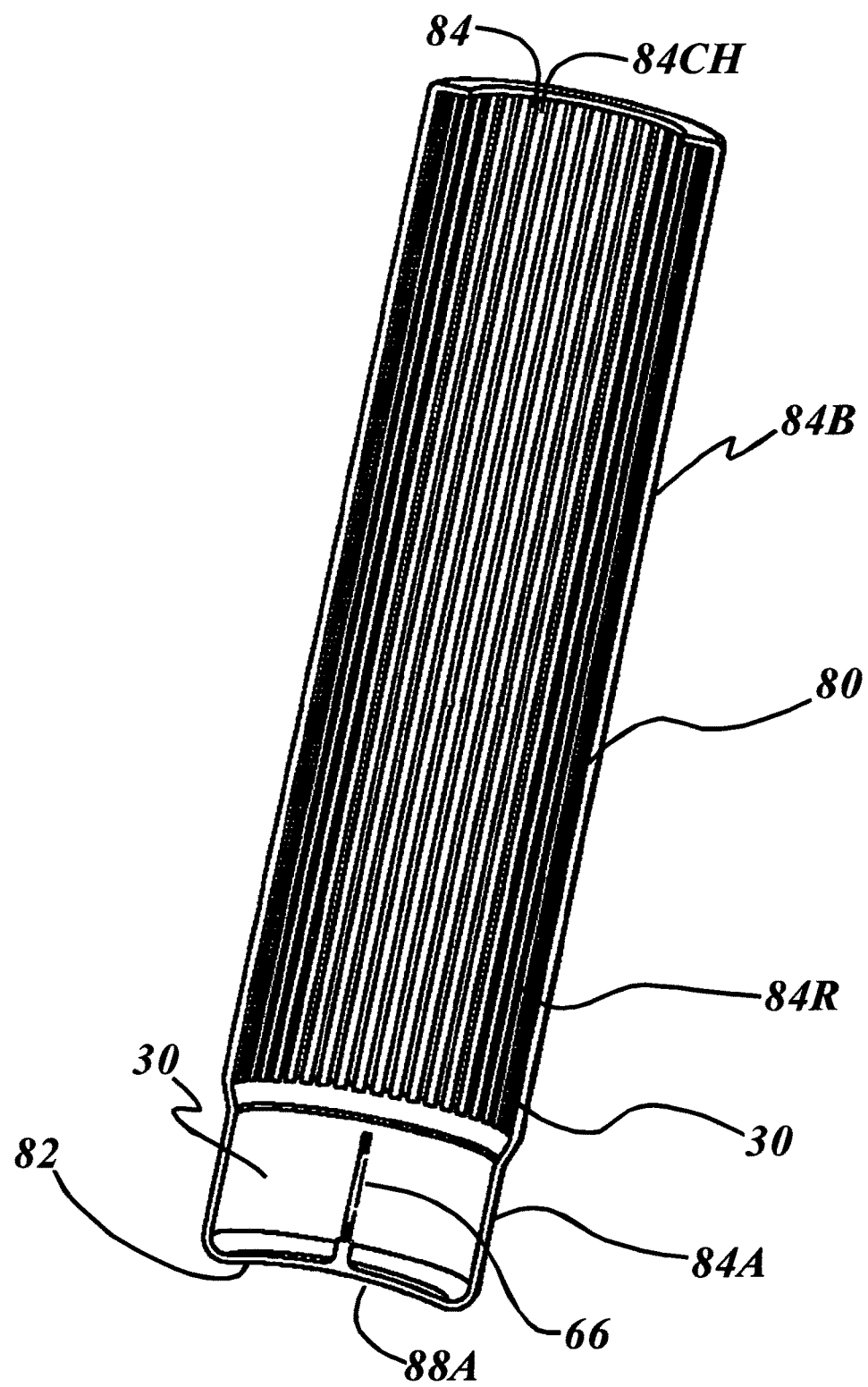
FIG. 3 is cross-sectional side view of the actuating sleeve member, showing the internal longitudinal ribs and channels and the pin valve member.
Figure 4:
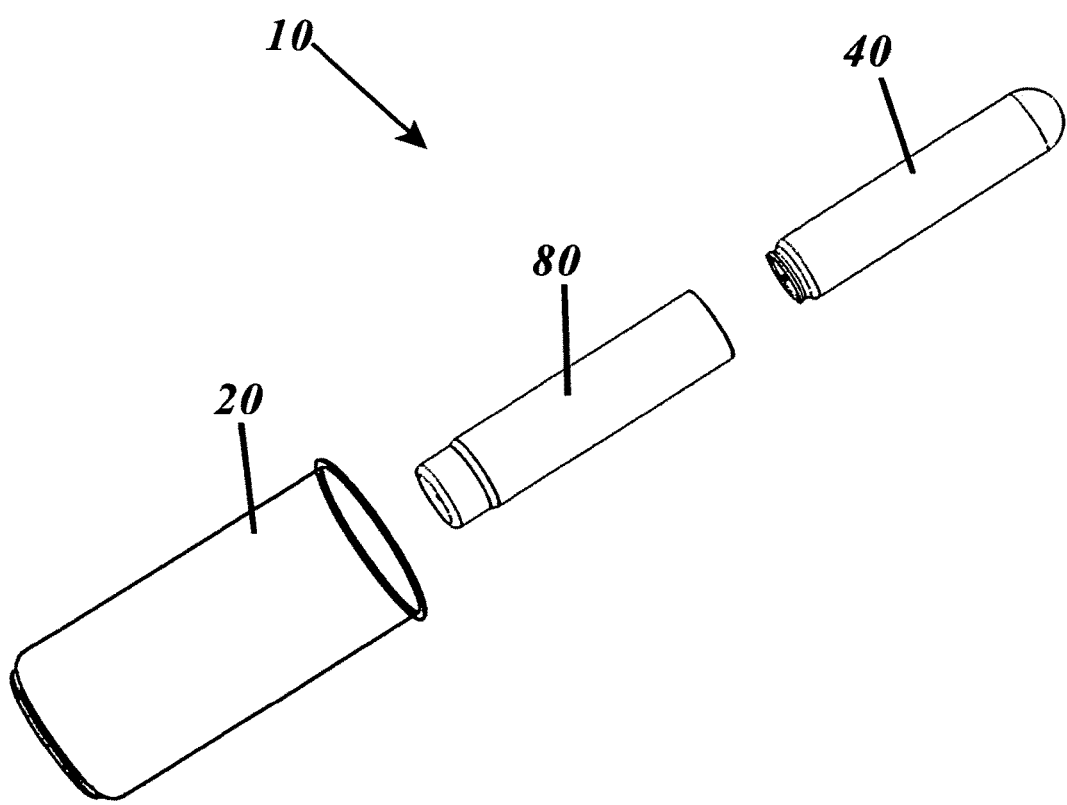
FIG. 4 is an exploded side view of the product container, actuating sleeve member and dry gas canister member.
Figure 5:
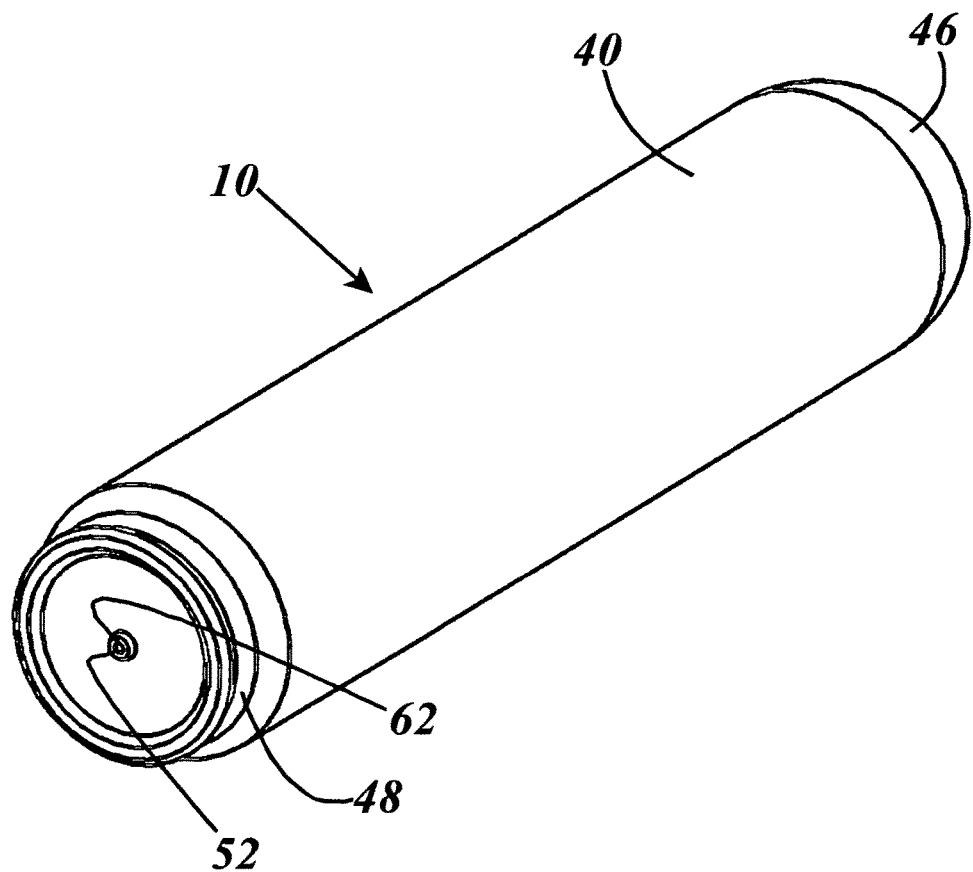
FIG. 5 is a perspective view of the preferred dry gas canister member, showing the canister member supply port.
Figure 6:
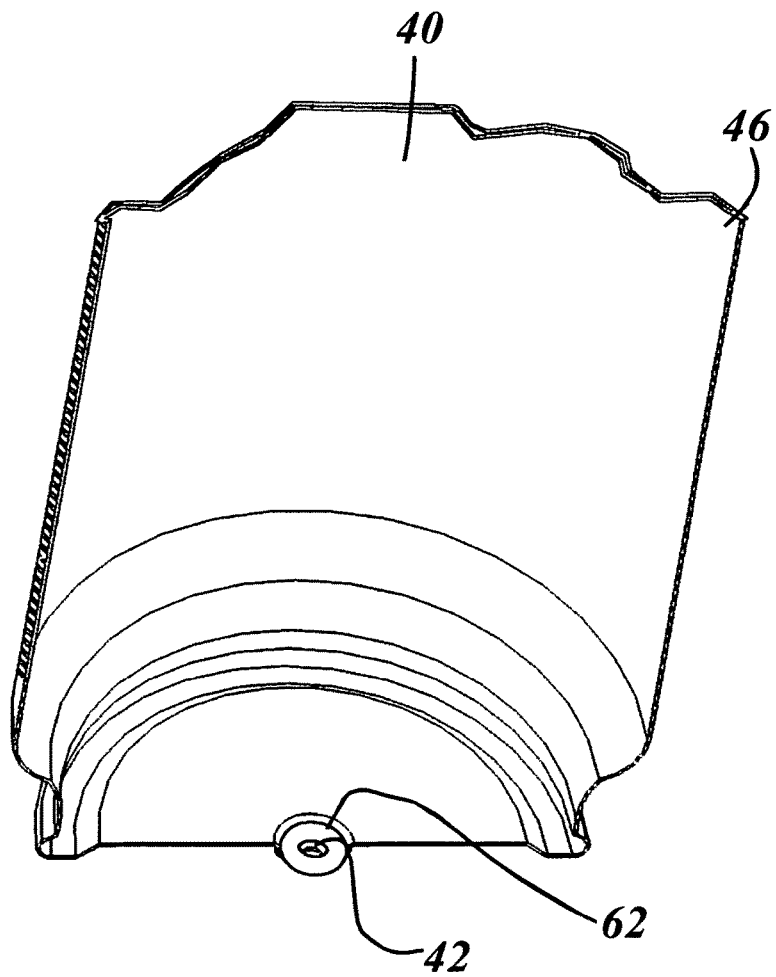
FIG. 6 is a broken away end view in cross-section of the dry gas canister narrow neck valve portion.
Figure 7:
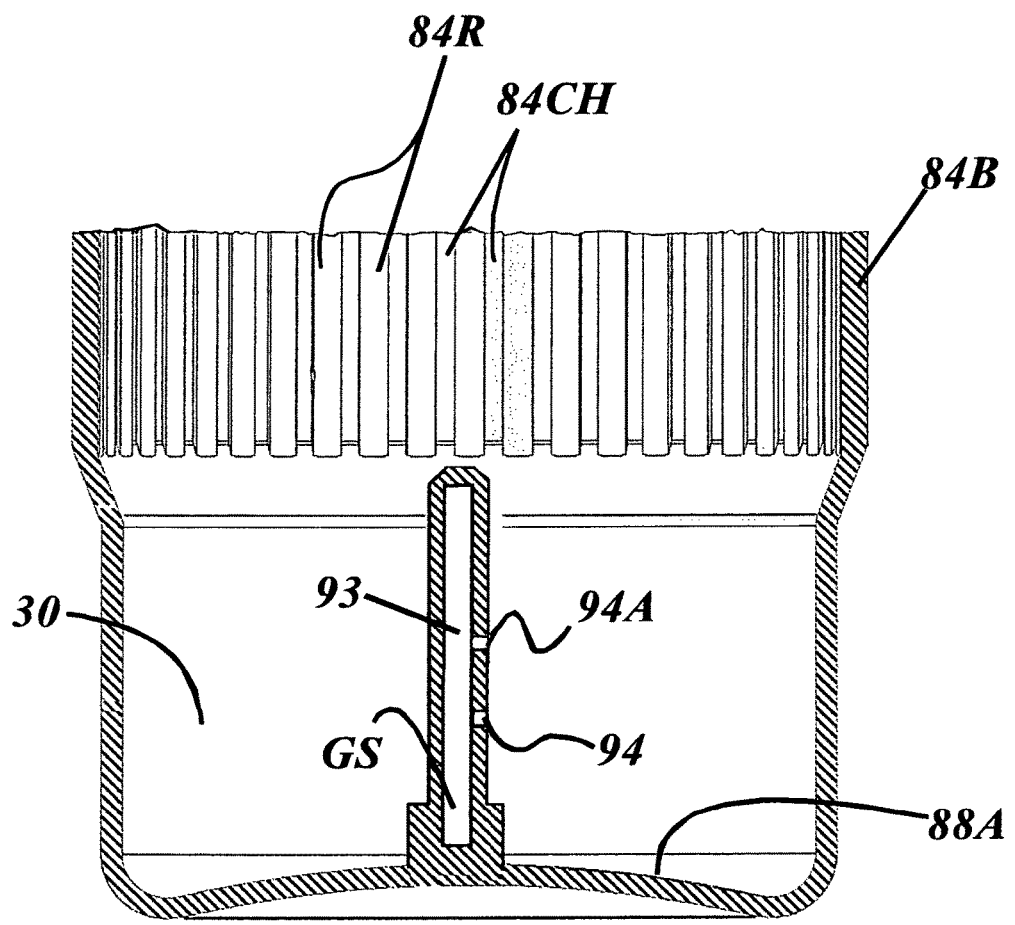
FIG. 7 is a broken away end view in cross-section of the actuating sleeve member closed end portion with a hollow tubular spray stem having spray cross-holes.
Figure 8:
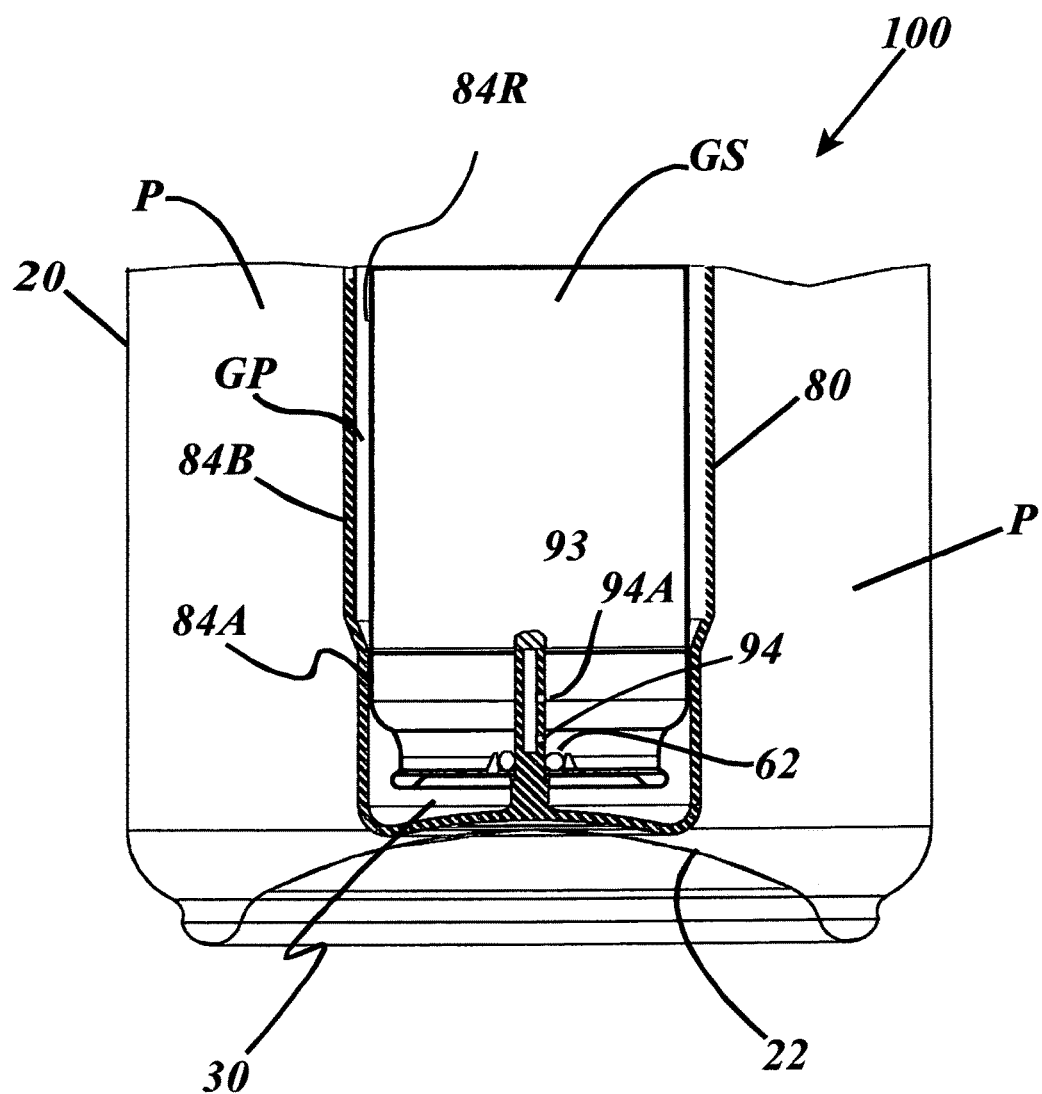
FIG. 8 is a cross-sectional side view of the lower end of the metal can embodiment of the container apparatus, showing the product container with an inwardly domed container bottom wall, and showing the actuating sleeve member with correspondingly inwardly domed closed end portion mounted and bonded to the domed container bottom wall, with the dry gas canister fitted into the actuating sleeve member so that the pin valve pin member in the form of the tubular spray stem with spray cross-holes sealingly fitted into the canister member supply port.
Figure 9:
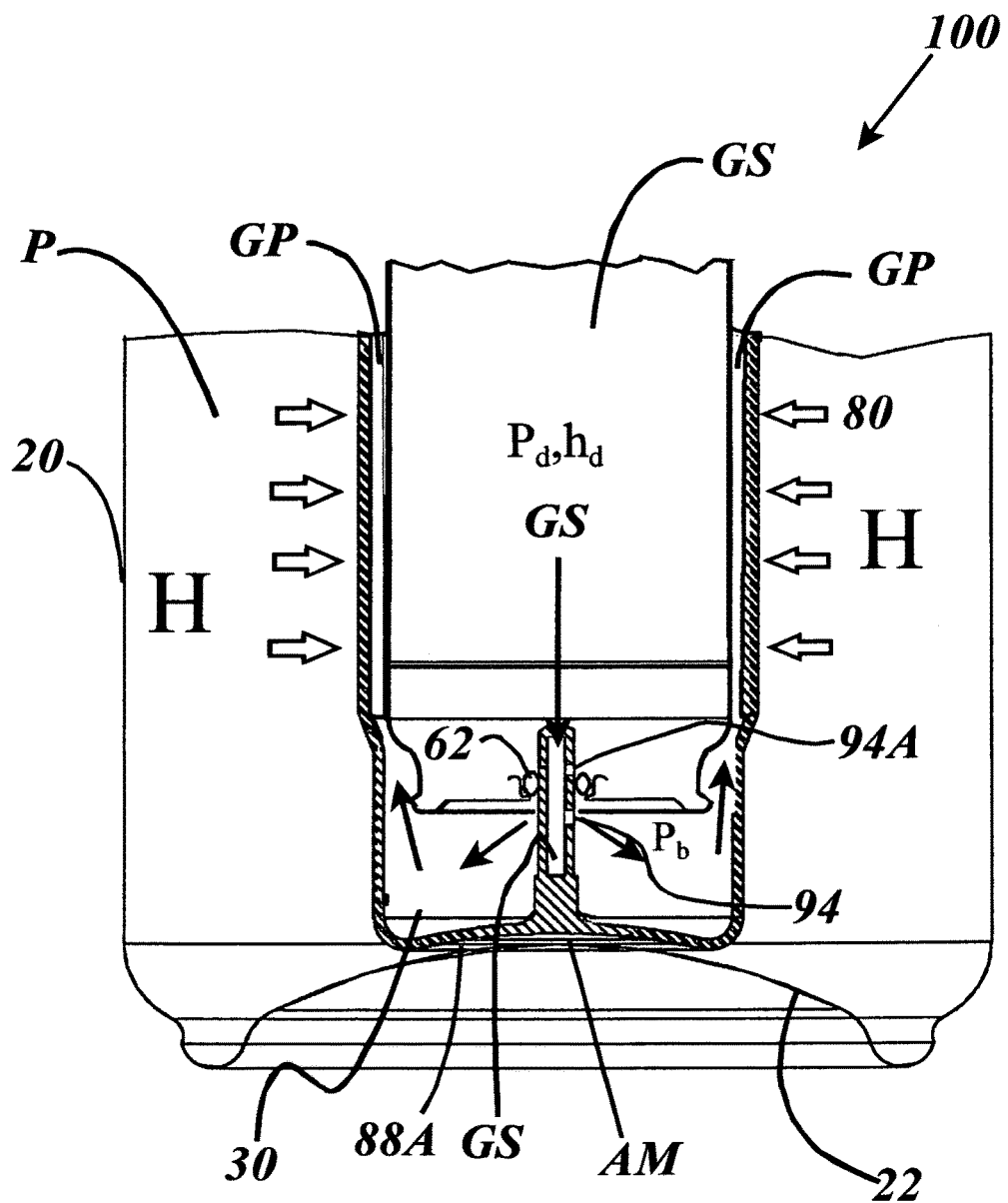
FIG. 9 is a cross-sectional side view as in FIG. 9 after the container opening means have opened the product release port and the dry gas canister member has elevated within the sleeve member and the spray cross-holes are uncovered and open, with arrows representing the pressure of the product on the sides of the actuation sleeve member and showing the path of the released dry gas into the annular gap between the dry gas canister member and the actuation sleeve member.
Figure 10:
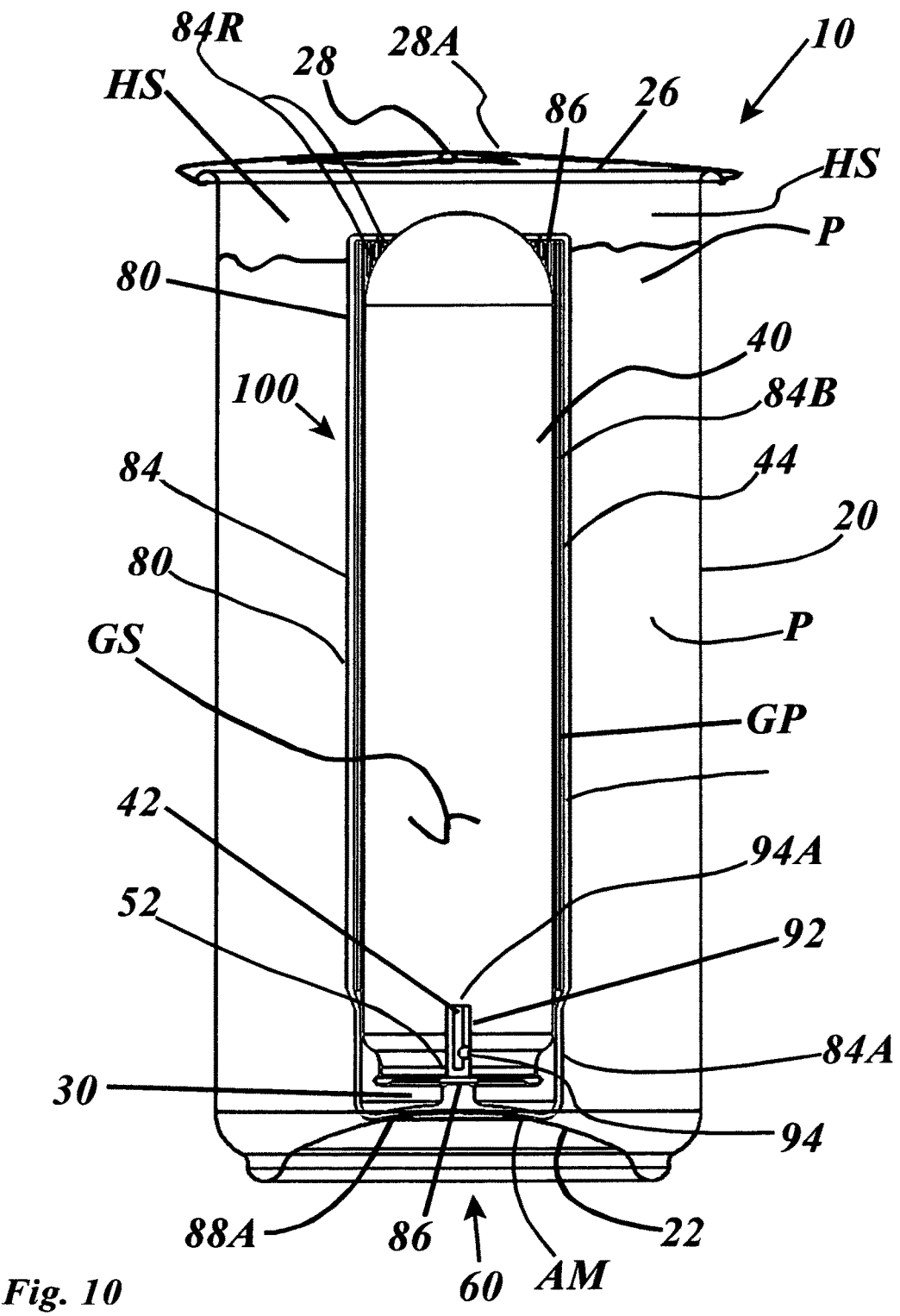
FIG. 10 is a cross-sectional side view of the container apparatus with the container opening means still closed over the product release port.
Figure 11:
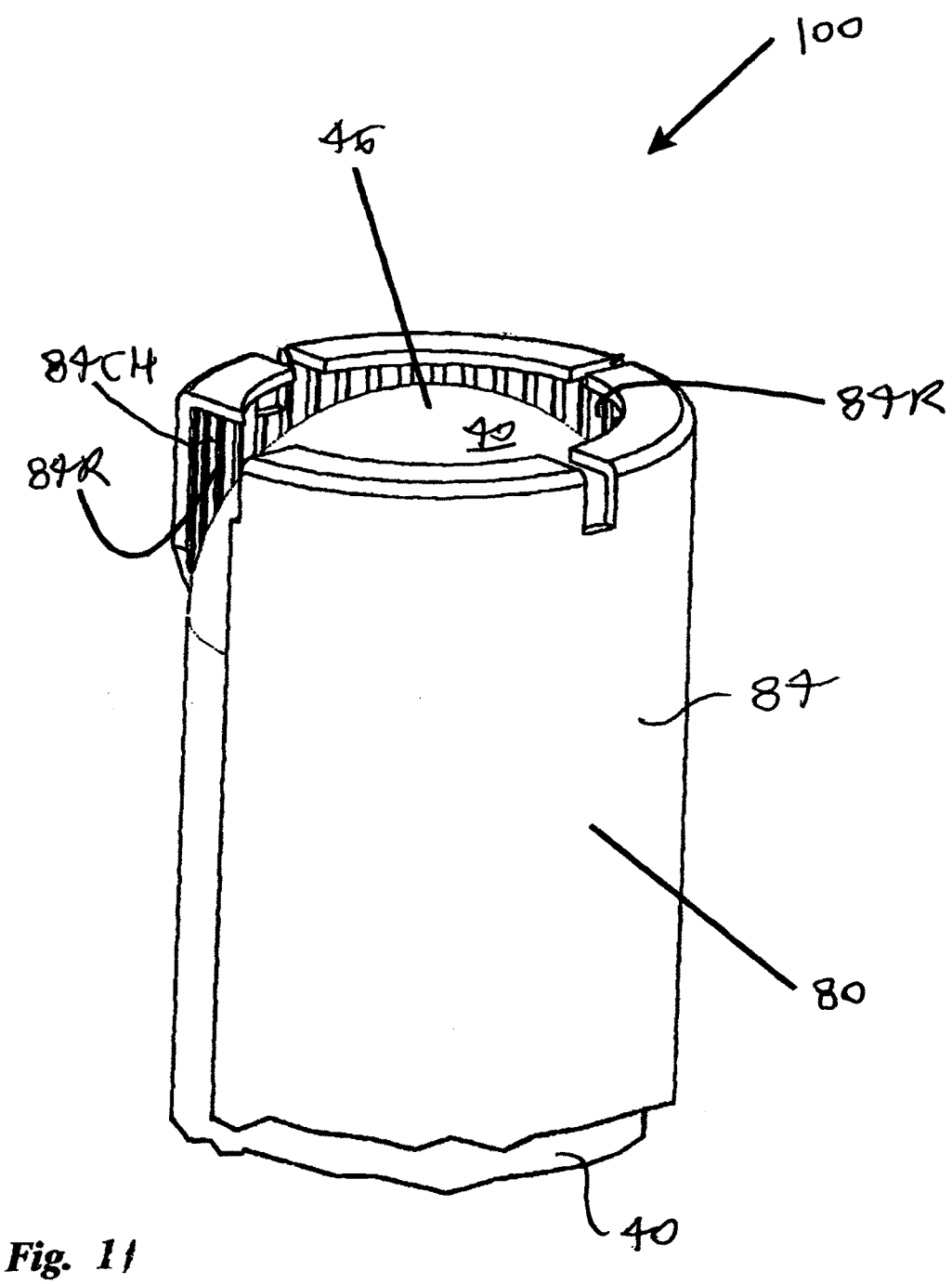
FIG. 11 is a view as in FIG. 11 after the container opening means has been operated to open the product release port, so that the pressure differential has caused the dry gas canister to rise within the actuation sleeve member and uncover the spray cross-holes to release the dry gas into the actuation chamber and through the humidification gap.
Figure 12:
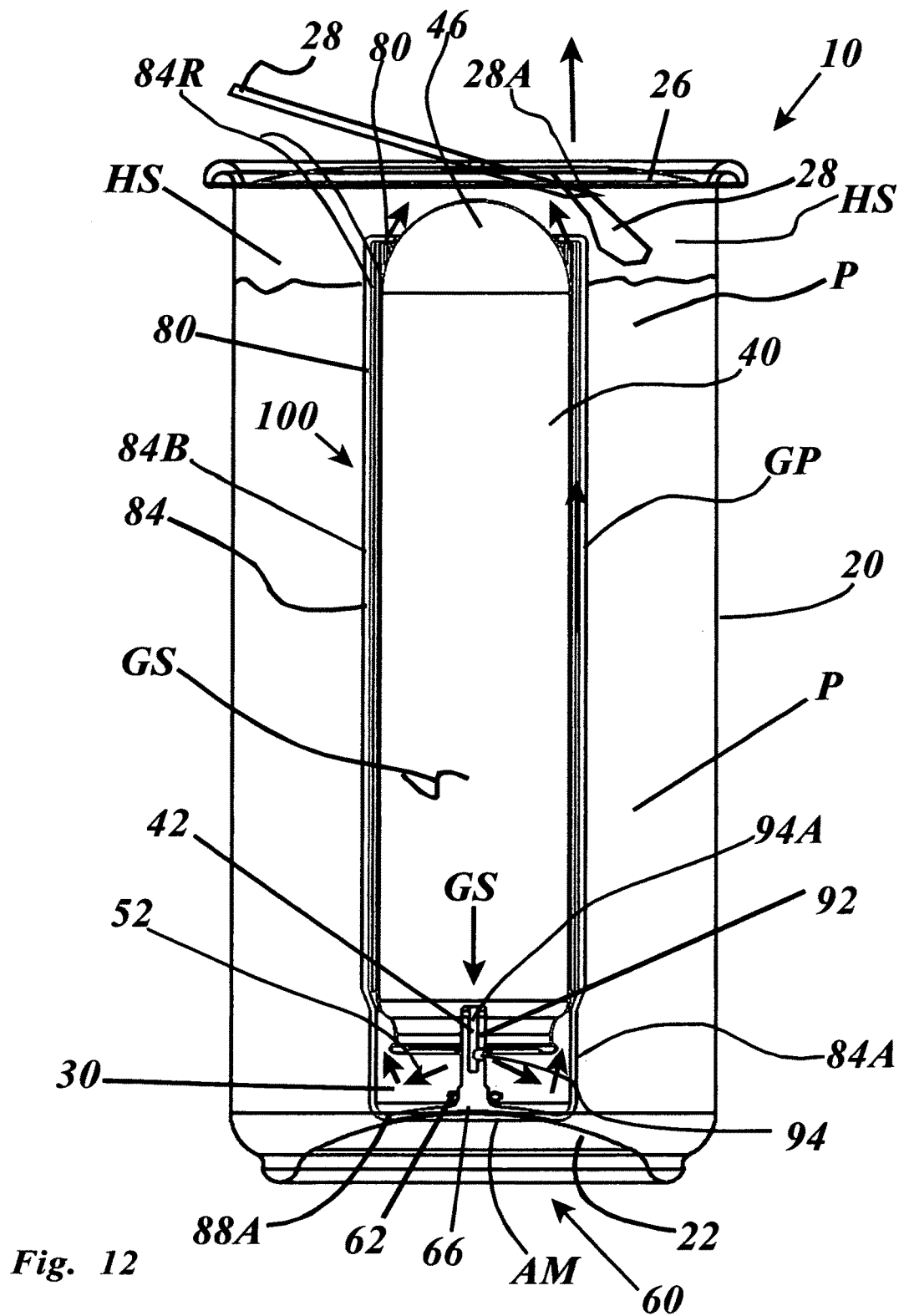
FIG. 12 is a broken away perspective side view of the actuation sleeve member and dry gas canister within the sleeve member prior to elevation of the dry gas canister upon opening of the product release port.
Figure 13:
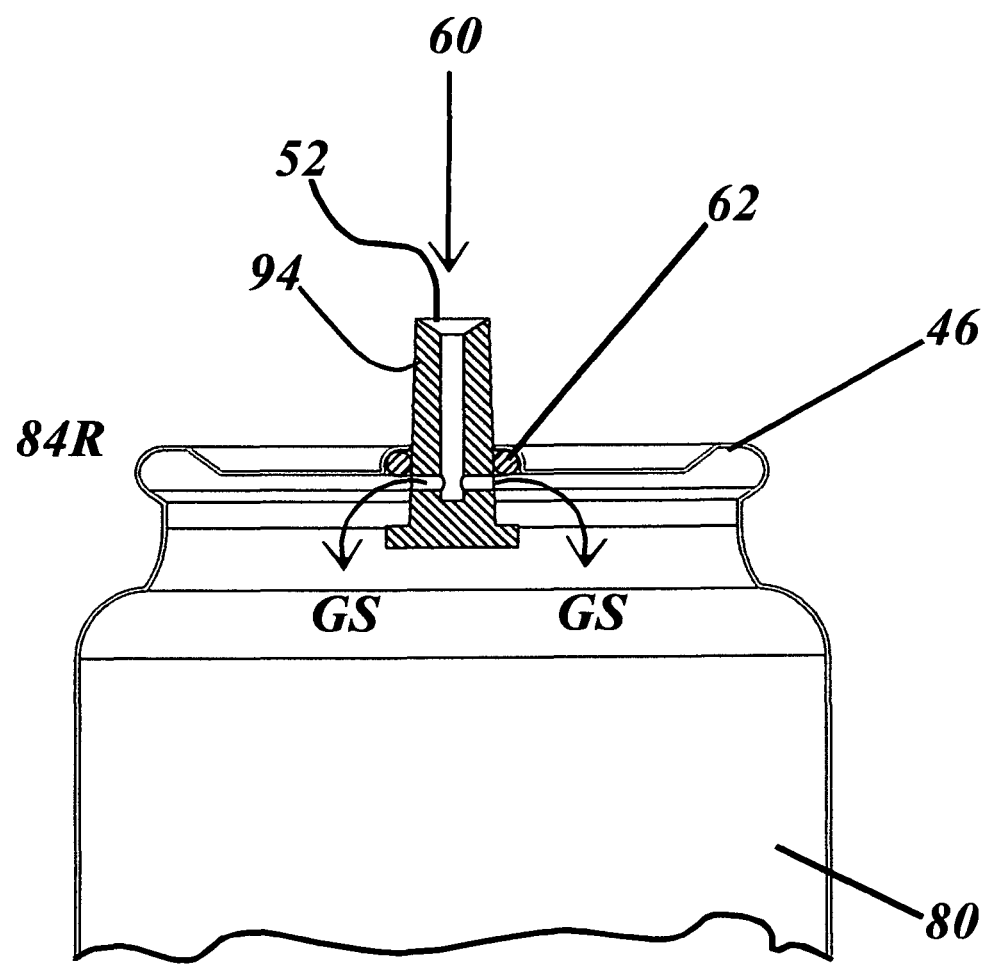
FIG. 13 is a broken away cross-sectional side view of the dry gas canister upper end showing the hollow tubular spray stem having spray cross-holes and O-ring seal during charging with dry gas.
Figure 14:
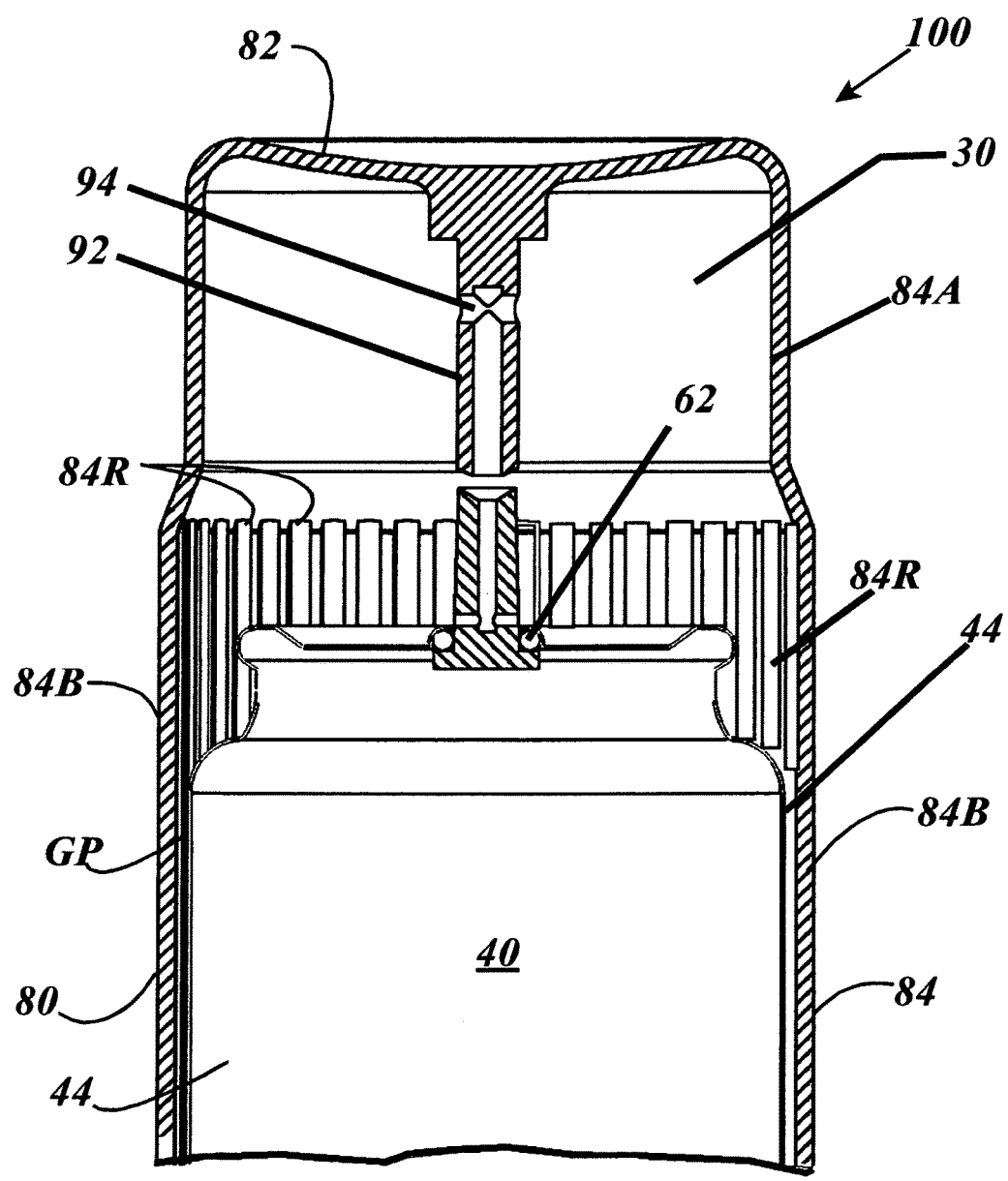
FIG. 14 is a cross-sectional side view of the upper ends of the dry gas canister member and the surrounding actuation sleeve member with spray stem sections beveled to fit sealingly together.

An actuating sleeve member 80 is made in the form of a thin-walled cylinder with a closed end portion 86 with a sleeve end wall 88A and an open neck portion 88. As shown in FIG. 2, in the first preferred embodiment, the actuating sleeve member 80 also acts as a cooling sleeve for heat exchange between the beverage P and the dry gas GS as it humidifies. In this case, the closed end portion 86 of the actuating sleeve member 80 connects to a first cylindrical wall portion 84A of the actuating sleeve member 80 and has an inner wall diameter that forms a tight snug fit over the outer diameter of the dry gas canister member 40. The closed end portion 82 of the actuating sleeve member 80 has a central axially protruding cylindrical actuation pin valve member 66 that is used to displace the temporary pin valve member 64 and to seal-off the pin valve member retention hole 52 of the dry gas canister member 40 during storage.

The first cylindrical wall portion 84A of the actuating sleeve member 80 connects to and expands to a slightly larger diameter second cylindrical actuating sleeve member wall portion 84B, with an inner diameter that is slightly larger than the outer diameter of the dry gas canister member 40 to form a thin cylindrical humidification gap GP between the outer wall of the dry gas canister member 40 and the inner wall of second cylindrical actuating sleeve member 80 wall portion of the actuating sleeve member 80. The second cylindrical actuating sleeve member wall portion 84B has an inner surface that is designed for maximal area of contact with the beverage P. Preferably, the second cylindrical actuating sleeve member wall portion 84B is a serrated (undulated) surface, with longitudinal ribs 84R spaced evenly to form an inner surfaces 44 that firmly contact the longitudinal outer cylindrical wall 48 of the dry gas canister member 40, so as to isolate and form narrow heat transfer channels 84CH between ribs or fins 84R with the outer wall 48 of the dry gas canister member 40. These heat transfer channels 84CH effectuate intimate contact of the beverage P with the dry gas canister member 40 and with the dry gas GS exiting the dry gas canister member 40 during use. They also allow the beverage P contents to be bubbled through narrow heat transfer channels 84CH to increase beverage P contact with the dry gas GS. beverage-feed-cross-holes 94b on the wall of the first cylindrical wall portion 84A of the actuating sleeve member 80 allow fresh beverage P to be pulled through and carried upwards in each heat transfer ribs 84R or serrations as dry gas GS bubbles upwards.

To assemble the apparatus 10, the dry gas canister member 40 is first vacuumed so that all gases are removed from therein. This ensures that no moisture is present within the dry gas canister member 40. A suitable dry gas GS such as $CO_2$ or air is dehumidified as much as possible to remove all moisture contained in it. Standard humidification equipment can be used to dehumidify the gas GS and store it in storage tanks for future use. Dehumidification equipment such as Aircell made by CompressedAir, USA, Enervac, made by Enervac Inc, USA, and from other manufacturers can be used to dehumidify the gas GS to up to $-100°$ F. Compressed gas dryers are commonly found in a wide range of industrial and commercial facilities. Such dehumidification equipment use technologies that rely on desiccant dryers with dew points up to $-100°$ F., refrigerated dryers with dew points up to $-50°$ F., deliquescent dryers, membrane dryers with dew points up to $-150°$ F. Before the dry gas canister member 40 can be charged with dry gas GS, the dry gas GS must be prepared in a very special manner. As an example, if air is used, regular air has a relative humidity ranging from 1% to about 100%. Thus the dryer the climate the more cost effective the preparation of the dry air GS will be. Regular humid gas is first compressed and passed through very fine filter elements to remove all debris and airborne contaminants of a particle nature. The compressed and filtered gas is passed through a dehumidifying station to remove substantially all water vapor and oils from it to obtain very clean dry gas GS. It is important that as much moisture is removed from the humid gas as possible. Advantageously it is possible to remove nearly 99.999% of the moisture from the gas so that its dew point is as low as possible. It is possible to bring the dew point to at least $-150°$ F. at a relatively high pressure of about 150 psi. This can be achieved by using refrigerants, desiccants or dehumidifiers that remove as much water vapor as possible from the gas to get extremely dry gas GS. The purpose of drying the gas is to remove as much of its thermodynamic-load as possible so that it is a negative thermodynamic energy state relative to its humid ambient state. Further, it removes the need to use desiccants in a self-cooling container. Dehumidifiers can be built at an industrial level and manufacturers such as Twin Tower engineering Inc., provide equipment that can prepare gases to have dew points that are $-100°$ F. and below. Membranes may also be used to remove moisture from air to prepare dry air GS for the application of this invention. SUNSEP-W™ brand membrane gas dryer technology is the patented membrane fibers developed by Asahi Glass Company (AGC). There are many other examples of companies that make commercially available gas dryers. After the removal of moisture and the drying of the gas GS, the dry gas GS is stored in a pressurized dry gas tank to cool down. The dry gas GS now has a tremendous thermodynamic potential to humidify and absorb moisture from any environment. It is important that the pressurized dry gas tank be moisture-free and should be made from materials that have very low or no humidity migration potential. The dry gas GS has a tendency to pull moisture from its environment so care must be taken to ensure that this does not occur.

After preparing the dry gas GS, it is supplied into the dry gas canister member 40 until the maximum allowable pressure is attained for storage. Pin valve member 64 is then inserted into the pin valve member retention hole 52 of the dry gas canister member 40 to seal off and temporarily store the dry gas GS therein. The narrow neck valve portion 48 of the dry gas canister member 40 is then passed axially centered through the open end of the actuating sleeve member 80 and made to slide into the larger diameter second cylindrical wall portion 84B of the actuating sleeve member 80 until it snugly engages the smaller diameter first cylindrical wall portion 84A of the actuating sleeve member 80 to form a sealed actuation chamber 30 with the closed end portion 86 of the actuating sleeve member 80. The first cylindrical wall portion 84A of the actuating sleeve member 80 seals off the closed end portion 86 of the actuating sleeve member 80 and the valve portion 60 of the dry gas canister member 40 to form an actuation chamber 30. At the same time, the pin valve member 64 that maintains the pressure within the dry gas canister member 40 is displaced and replaced by the actuation pin valve member 84 of the actuating sleeve member 80 to act as the final seal of the dry gas canister member 40. The larger diameter second cylindrical wall portion of the actuating sleeve member 80 forms a thin annular humidification chamber HC that is exposed to the beverage P contents through the open end of the actuating sleeve member 80 when the beverage is filled.

Figure 16:
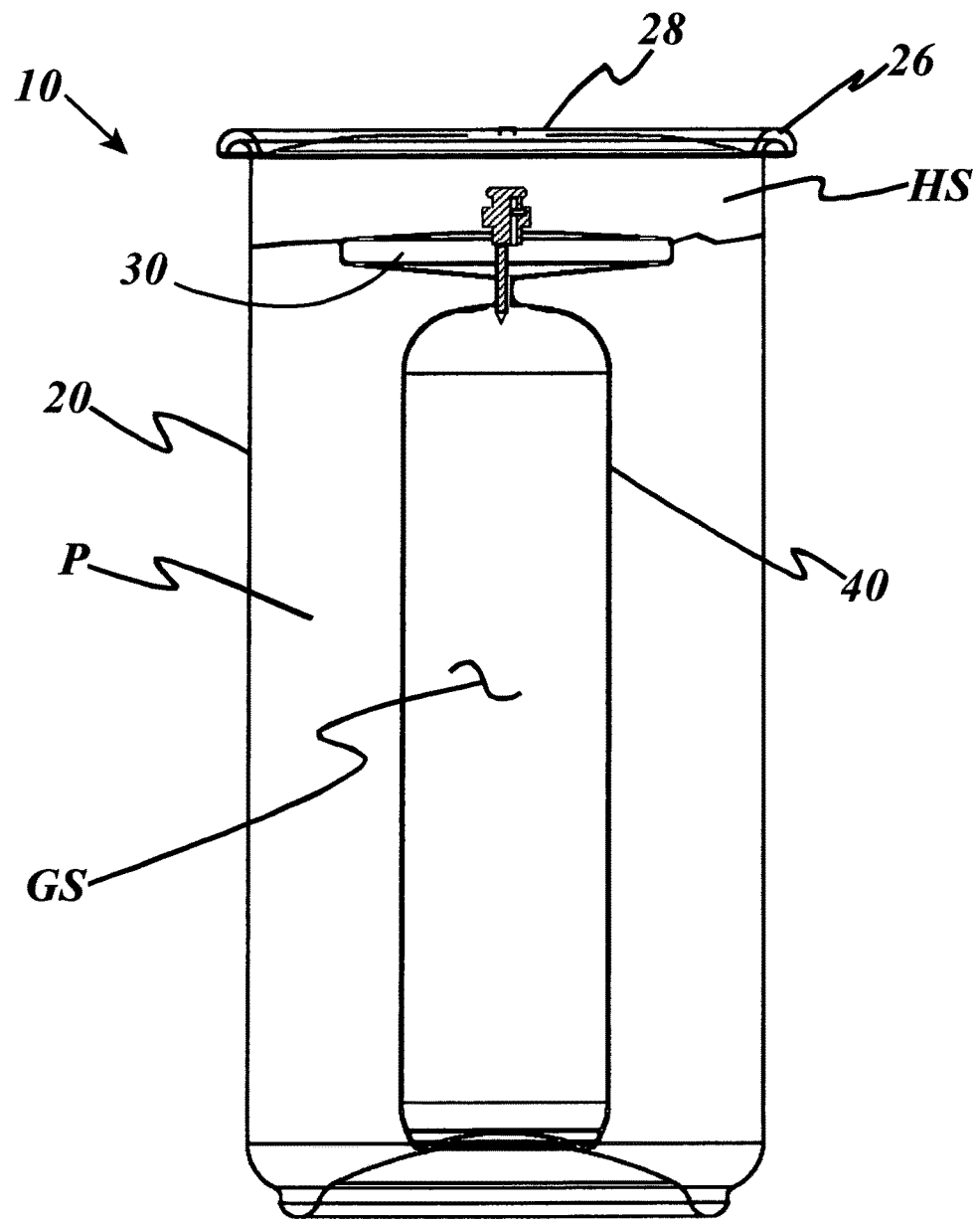
FIG. 16 is a side view of the dry gas canister of FIG. 16 mounted inside the product container prior to actuation of the container opening means.

In this embodiment, if a metal beverage container 20 is used, the contour of the outer wall of the closed end portion 86 of the actuating sleeve member 80 is preferably shaped to match the container bottom domed wall 22 of the can 20. This way, the actuating sleeve member closed end 82 can be affixed to the container bottom domed-end 22 of the can 20 using a suitable food grade epoxy, or by using ultrasonic welding. Thus, the canister assembly 100 is affixed centrally within the beverage container 20 so that the open end 88 of the actuating sleeve member 80 is close to the headspace of the beverage P within the beverage container 20. If a bottle 20 is used as a beverage container 20, the actuation sleeve could be elongated with a bottle neck attachment sleeve 54 to attach to the neck wall 24 of the bottle 20 as shown in FIG. 16. The design and operation involve exactly the same steps as for a metal container, can 20.

The apparatus 10 comprising the beverage container 20 and the canister assembly 100 is now ready to be filled with beverage P contents. Advantageously, the beverage P is filled and the beverage container closure 26 is placed and sealed over the beverage container 20 to keep the contents under carbonation or nitrogen pressure. The beverage P contents overflow and fill the humidification chamber HC when beverage P is poured into the beverage container 20. As the beverage P pressure rises, carbonation (or nitrogen) gases and liquids used with the beverage P permeate the actuation chamber 30 and equilibrate in pressure with the surrounding beverage P pressure. The assembled container 20 is then ready for consumption.

To use the invention, the beverage container opening means 28 is opened to allow the carbonation pressure to drop and equilibrate with atmospheric pressure. Stored carbonation pressure within the actuation chamber 30 increases relative to atmosphere and cause the dry gas canister member 40 to slide relative to the actuating sleeve member 80 and cause the actuation chamber 30 to expand until the dry gas canister member 40 is free from it sealing engagement with the smaller diameter first cylindrical wall portion 84A of the actuating sleeve member 80. Actuating sleeve member 80 pulls out the actuation pin valve member 66 to open up the dry gas canister member 40 and allow the dry gas GS to escape from therein and enter into the humidification gap GP. The dry air GS causes water from the beverage P to evaporate and be carried away by the dry gas GS as it humidifies to normal atmospheric humidity. An adequate amount of energy is absorbed from the beverage P by the water that evaporates thereby cooling the beverage contents.

Figure 15:
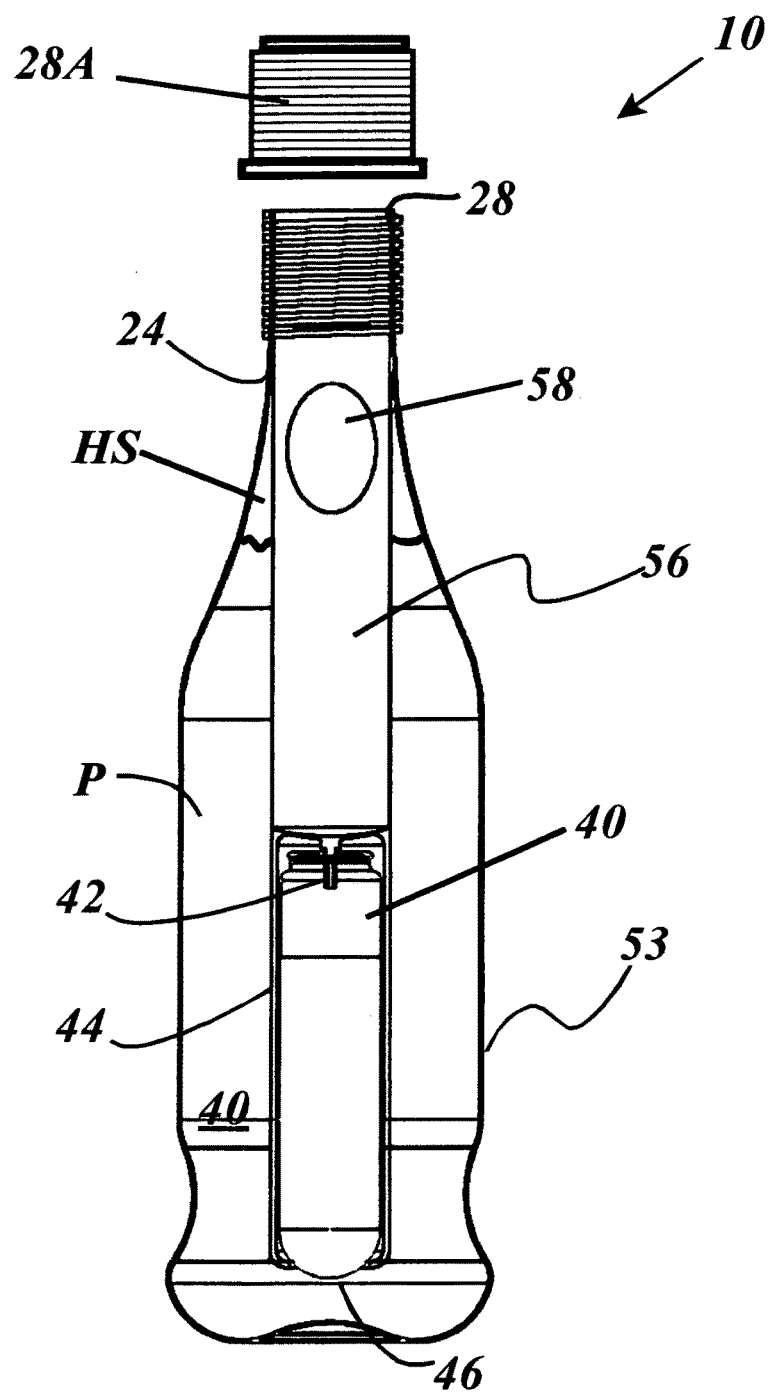
FIG. 15 is a cross-sectional side view of a second embodiment of the invention in which the product container is a plastic bottle.

If a plastic bottle 20 is used, the open end 28 of the actuating sleeve member 80 can be extended as shown in FIG. 15 to form the bottle neck attachment sleeve 56 and to snugly fit into the neck wall 24 of the plastic beverage bottle 53, so that it can be held in place by friction, or by ultrasonic welding. Provisions must be made to cut bottle beverage passages 58 on the sleeve extension 56 for the beverage P to freely pass through the walls of the actuating sleeve member 80 for consumption. A variety of attachment means AM can be incorporated to install the canister assembly 100 into the beverage container 53. In some cases, the canister assembly 100 can just be dropped into the beverage container 20 or the plastic beverage bottle 53 and left to freely float therein. Since it is lighter than its displaced beverage P, it floats freely, and when the beverage container 20 or bottle 53 is pivoted for consumption, canister assembly 100 floats away from the product release port 28A to allow the beverage P to free pass for consumption. Advantageously the invention teaches a method of cooling a beverage P by means of humidification of a dry gas in the stead of desiccant dehumidification cooling, phase change cooling, and cryogenic expansive cooling.

Third Preferred Embodiment

Figure 17:
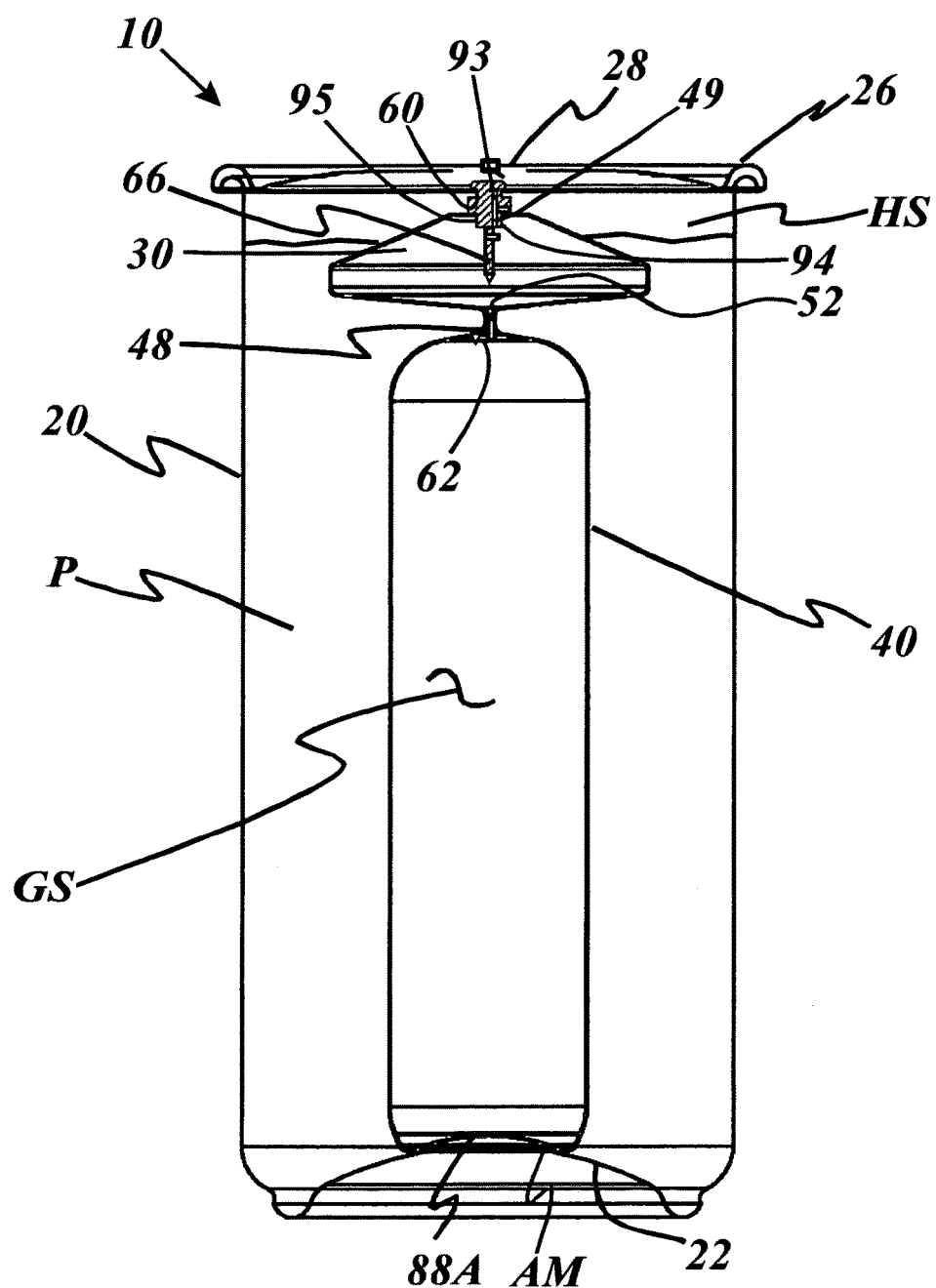
FIG. 17 is a side view as in FIG. 17 after actuation of the container opening means has opened the product release port.

This embodiment is shown in FIGS. 16 and 17. The dry gas canister member 40 is blow-molded or spun as one piece with the actuation chamber 30. In the case when the dry gas canister member 40 is made from metal, it can be made by spinning metal alloys to form a dry gas canister member 40 that fluidly connects with a narrow neck valve portion 48 that to a larger diameter pancake shaped actuation chamber 30 as a single piece. This can be achieved by spinning. If dry gas canister member 40 is made from plastic, it can be injection blow-molded with the actuation chamber 30 as a contiguous piece. The narrow neck valve portion 48 with the pin valve member retention hole fluidly connects the dry gas canister member 40 to the actuation chamber 30. The actuation chamber 30 has a small open narrow neck portion 49 that opens to atmosphere before assembly. The diameter of the pin valve member retention hole 52 should be sized to control the flow rate of pressurized dry gas GS stored the dry gas canister member 40. A size of about 0.05 mm to 0.5 mm in diameter can accommodate all suitable gas GS expulsion rates that may be required for the various pressures and gas GS types used. The size of pin valve member retention hole 52 should be made to allow the dry gas GS from dry gas canister member narrow neck valve portion 48 to exit and permeate and comingle properly with the particular beverage P being cooled to allow proper heat exchange to occur. In some cases, carbonation of the beverage P may cause foaming and frothing and the size of pin valve member retention hole 52 should be made to avoid uncontrollable carbonation or frothing especially in beers and sodas. Thus effectively, dry gas canister member 40 is a pressure vessel such as an aerosol container of suitable size that can store pressurized dry gases GS. It is preferable that the closed end portion 46 of the dry gas canister member 40 be spherical to allow an even pressure profile, however, the closed end of dry gas canister member 40 can also be designed to act as a mating surface for gluing and holding the canister assembly 100 container bottom domed wall 22 at the base dome of a beverage container 20 such as a metal can.

A tight fitting actuation pin valve member 66 is provided to act as a valve that fits snugly and sealingly into pin valve member retention hole 52. Actuation pin valve member 66 is be used to block-off the pin valve member retention hole 52 of the dry gas canister pressure member 40 after charging it with pressurized dry gas GS. The pin valve member retention hole 52 is preferably small in diameter and cylindrical in shape, however it may be made to have a cross-section of any shape that is suitable for its purposes. An O-ring 62, rubber seal or sealant epoxy, may be incorporated to form a tight seal and block off gases GS from escaping between the outer diameter of the pin valve member 66 and the inner diameter of the pin valve member retention hole 52. The actuation pin valve 60 is not assembled with the dry gas canister member 40 until the dry gas GS has been filled into the dry gas canister member 40.

The integrated actuating chamber 30 is designed to expand when subjected to carbonation pressure relative to atmosphere since it has thin walls. The actuating chamber 30 serves as a humidification chamber for dry gas GS exiting the dry gas canister member 40. The actuation pin valve 60 has a larger diameter axially protruding cylindrical spray stem 92 that fits tightly into the small narrow neck portion of the actuation chamber 30. An actuation pin valve member 66 with a smaller diameter extends and fits tightly into the pin valve member retention hole 52. An axial offset spray feed-hole 93 projecting into the spray stem 92 connects the interior of the actuation chamber 30 to a spray cross-hole 94 on the spray stem 92. It is important that the spray cross-hole 94 in the spray stem 92 extends above the liquid P level of beverage container 20.

To assemble the first embodiment of apparatus 10, the dry gas canister member 40 is first vacuumed so that all gases are removed from therein. This ensures that no moisture is present within the dry gas canister member 40. A suitable dry gas GS such as $CO_2$ or Air is dehumidified as much as possible to remove all moisture from it. Standard humidification equipment can be used to dehumidify the gas and store it in storage tanks for future use. Dehumidification equipment such as Aircell made by CompressedAir, USA, Enervac, made by Enervac Inc, USA, and from other manufacturers can be used to dehumidify the gas to up to −100° F. Compressed gas dryers are commonly found in a wide range of industrial and commercial facilities. Such dehumidification equipment use technologies that rely on Desiccant dryers with dew points up to −150° F., Refrigerated dryers with dew points up to −150° F., Deliquescent dryers, Membrane Dryers with dew points up to −150° F.

Dry gas GS that has been prepared is supplied into the dry gas canister member 40 until the maximum allowable pressure is attained for storage. Actuation pin valve member 66 is then inserted through the actuation chamber hole 95 so that both the actuation chamber hole 95 and the pin valve member retention hole 52 of the dry gas canister member 40 is sealed off. In this embodiment, if a metal beverage container is used, the contour of the outer wall of the closed end 40 of the dry gas canister member 40 is preferably shaped to match the container bottom domed-wall 22 of the can 20. This way, the dry gas canister member 40 can be affixed to the domed bottom domed-end 22 of the can 20 using a suitable food grade epoxy, or by using ultrasonic welding. Thus, the canister assembly 100 is affixed centrally within the beverage container 20 so that the spray stem 92 of the actuating sleeve member 66 is above the headspace of the beverage P within the beverage container 20. The apparatus 10 comprising the beverage container 20 and the canister assembly 100 is now ready to be filled with beverage P contents. Advantageously, the beverage P is filled and the beverage container closure 26 is placed and sealed over the beverage container 20 to keep the contents under carbonation or nitrogen pressure. As the beverage P pressure rises, carbonation (or nitrogen) gases and liquids used with the beverage P enter the actuation chamber 30 through the spray cross-hole 94 and then through the beverage cross hole and equilibrate in pressure with the surrounding beverage P pressure. The assembled container apparatus 10 is then ready for use.

To use the invention, the beverage container opening means 28 is opened to allow the carbonation pressure to drop and equilibrate with atmospheric pressure. Stored carbonation pressure within the actuation chamber 30 increases relative to atmosphere and cause the actuation chamber 30 to expand. This causes the actuation pin valve 60 to be pulled out of the pin valve member retention hole 52 to open up the dry gas canister pressure member 40 and allow the dry gas GS to escape from therein and enter into the actuation chamber 30. Dry air is then passed from the actuation chamber 30 through the stored liquid in the actuation chamber 30 and then through the axially oriented spray feed-hole 93 and through the spray cross-hole 94 on the spray stem 92. It is important that the spray cross-hole 94 in the spray stem 92 be above the liquid level of the beverage container 20. Dry gas GS humidifies by evaporating and absorbing water from the beverage P within the actuation chamber 30, and then pass through the spray feed-hole 93 and through the spray cross-hole 94 on the spray stem 92 to form a continuous spray of humidifying dry gas GS and mist above the beverage head space HS. It is important that the spray cross-hole 94 in the spray stem 92 be above the liquid level of the beverage container 20. As it humidifies to normal atmospheric humidity, the dry gas GS causes liquid from the beverage P to evaporate and be carried away to atmosphere. An adequate amount of energy is absorbed from the beverage P by the water that evaporates thereby cooling the beverage P contents.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of cooling a product comprising the steps of:
   providing a product container having a product release port with release port opening means and containing a product and a humidification liquid;
   providing a dry gas source in fluid communication with the product container and gas release means for releasing dry gas from the dry gas source, wherein the dry gas has a dew point below −100 degrees F.;
   operating the release port opening means to open the product release port; and operating the gas release means to release dry gas from the dry gas source into the product container upon opening of the product release port;
   such that dry gas from the dry gas source gathers moisture from the humidification liquid and absorbs heat from the product as a result of humidification of the dry gas and the humidified gas carries away the heat.

2. The method of claim 1, wherein the product comprises the humidification liquid.

3. The method of claim 1, wherein opening the product release port automatically activates the gas release means, such that humidification of the dry gas and the resulting cooling of the humidification liquid and therefore the product begins substantially as soon as the product container is opened.

4. The method of claim 1, wherein the gas release means comprises a gas release port.

5. The method of claim 4, comprising the additional steps of:
   charging the dry gas source with pressurized dry gas;
   providing a tight fitting temporary valve member for fitting into the gas release port in the dry gas source to act as a valve;
   and fitting the temporary valve member snugly and sealingly into the gas release port to temporarily close the gas release port.

6. The method of claim 5, wherein the temporary valve is a temporary pin valve.

7. The method of claim 4, comprising the additional step of: displacing the temporary valve member to release the dry gas by inserting an actuation pin valve member into the gas release port.

8. The method of claim 1, wherein the dry gas is one of: air, nitrogen and carbon dioxide.

9. The method of claim 1, wherein the gas source comprises a canister member contained within the product container.

* * * * *